US010270926B2

(12) United States Patent
Ando

(10) Patent No.: US 10,270,926 B2
(45) Date of Patent: *Apr. 23, 2019

(54) INFORMATION PROCESSING APPARATUS, INFORMATION PROCESSING SYSTEM, AND INFORMATION PROCESSING METHOD

(71) Applicant: RICOH COMPANY, LTD., Tokyo (JP)

(72) Inventor: Mitsuo Ando, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 112 days.

This patent is subject to a terminal disclaimer.

(21) Appl. No.: 15/154,020

(22) Filed: May 13, 2016

(65) Prior Publication Data

US 2016/0342577 A1 Nov. 24, 2016

(30) Foreign Application Priority Data

May 20, 2015 (JP) .................. 2015-102388

(51) Int. Cl.
*H04N 1/00* (2006.01)
*G06F 17/30* (2006.01)

(52) U.S. Cl.
CPC ... *H04N 1/00411* (2013.01); *G06F 17/30905* (2013.01); *H04N 1/00244* (2013.01); *H04N 2201/0094* (2013.01)

(58) Field of Classification Search
CPC ..................................................... G06F 17/22
See application file for complete search history.

(56) References Cited

U.S. PATENT DOCUMENTS

| 7,957,021 | B2 | 6/2011 | Moroi |
| 8,988,693 | B2 | 3/2015 | Ando |
| 9,124,733 | B2 | 9/2015 | Ando |
| 9,235,453 | B2 | 1/2016 | Ando |
| 2002/0038351 | A1* | 3/2002 | Khan ............... G06F 17/30905 709/217 |

(Continued)

FOREIGN PATENT DOCUMENTS

| JP | 2003-283718 | 10/2003 |
| JP | 2005-024994 | 1/2005 |

(Continued)

*Primary Examiner* — James J Debrow
(74) *Attorney, Agent, or Firm* — Oblon, McClelland, Maier & Neustadt, L.L.P.

(57) ABSTRACT

An information processing apparatus includes a conversion unit configured to convert second format data into first format data that differs from the second format data, the first format data being processable by a device connected to the information processing apparatus via a network; a first transmission unit configured to transmit the first format data converted by the conversion unit to the device; a first reception unit configured to receive, from the device, information that represents an operation to a screen displayed, based on the first format data transmitted by the first transmission unit, in a display unit of the device; and a second transmission unit configured to transmit, to the device, an instruction to execute a process defined in the second format data, the process relating to the operation represented by the information received by the first reception unit.

20 Claims, 23 Drawing Sheets

(56) References Cited

U.S. PATENT DOCUMENTS

| | | |
|---|---|---|
| 2007/0165265 A1 | 7/2007 | Ito et al. |
| 2014/0146363 A1 | 5/2014 | Hirokawa et al. |
| 2014/0215313 A1* | 7/2014 | Daly et al. ............. G06F 17/22 |
| 2015/0092233 A1* | 4/2015 | Park .................. G06F 3/1288 358/1.15 |
| 2015/0242381 A1* | 8/2015 | Oh et al. ................ G06F 17/22 |
| 2015/0264200 A1 | 9/2015 | Ando |
| 2015/0281332 A1 | 10/2015 | Naito et al. |
| 2015/0326751 A1 | 11/2015 | Ando |
| 2016/0080587 A1 | 3/2016 | Ando |
| 2016/0119506 A1 | 4/2016 | Namihira et al. |
| 2016/0344881 A1* | 11/2016 | Ando ................ H04N 1/00464 |

FOREIGN PATENT DOCUMENTS

| | | |
|---|---|---|
| JP | 2006-203869 | 8/2006 |
| JP | 2006-352845 | 12/2006 |
| JP | 2014-026424 | 2/2014 |
| JP | 2014-182793 | 9/2014 |

* cited by examiner

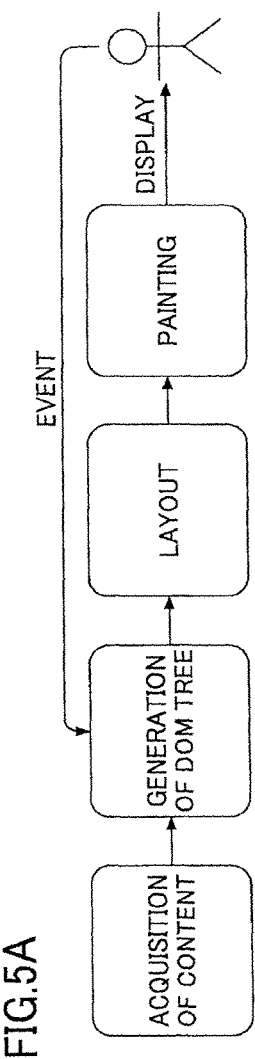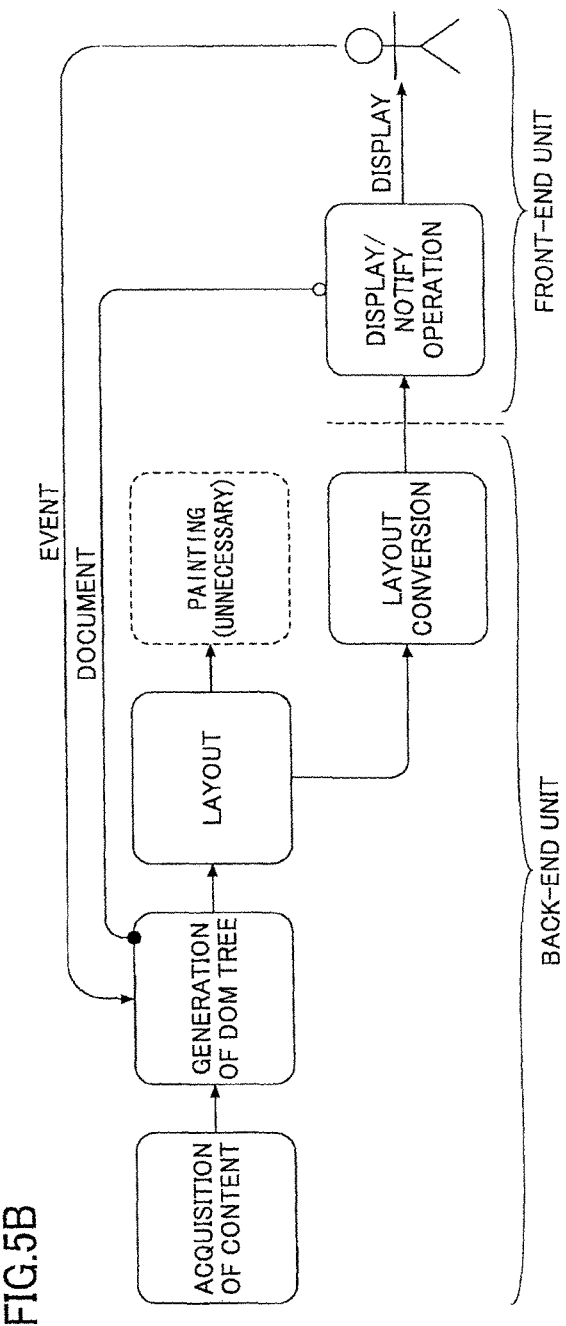

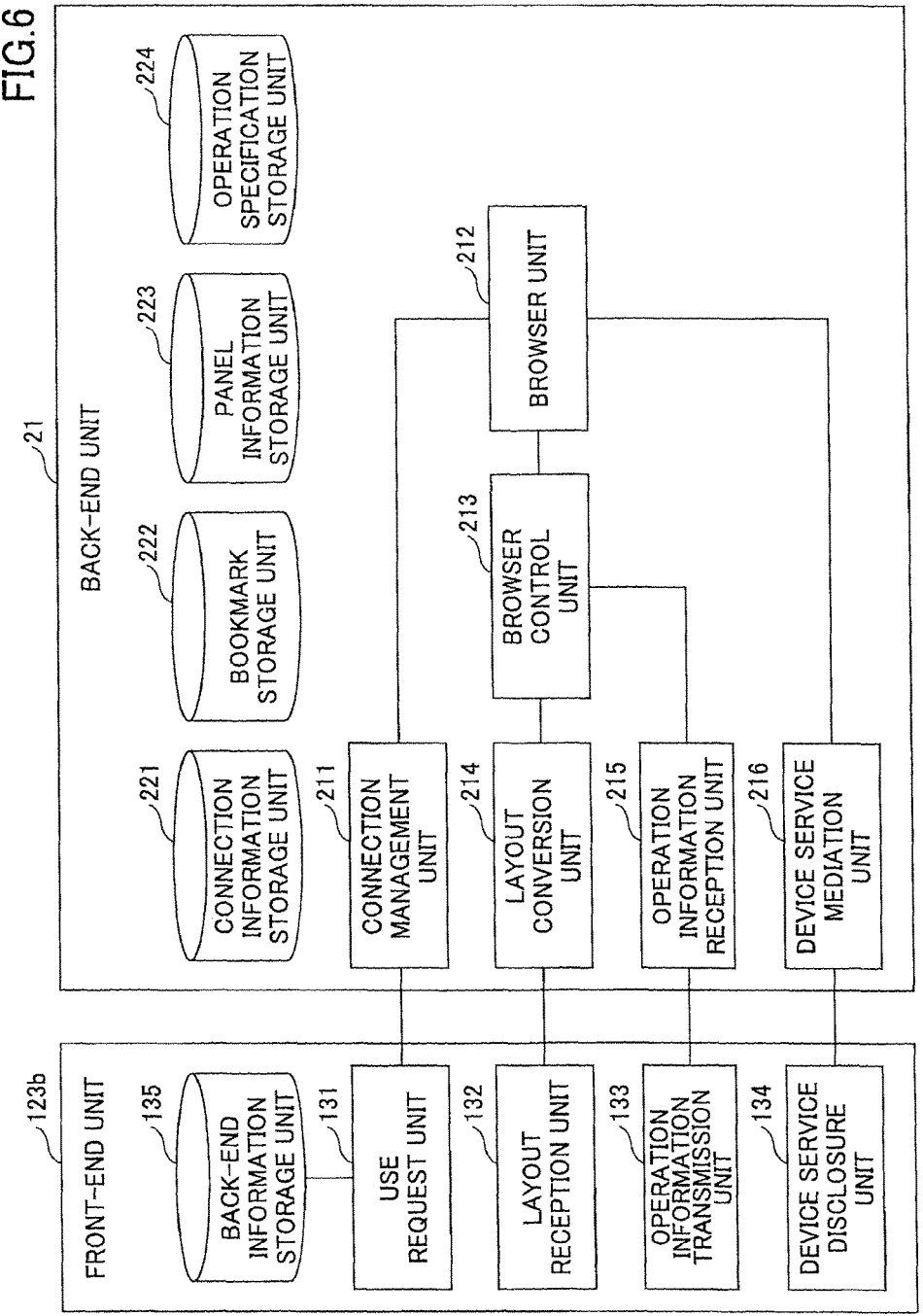

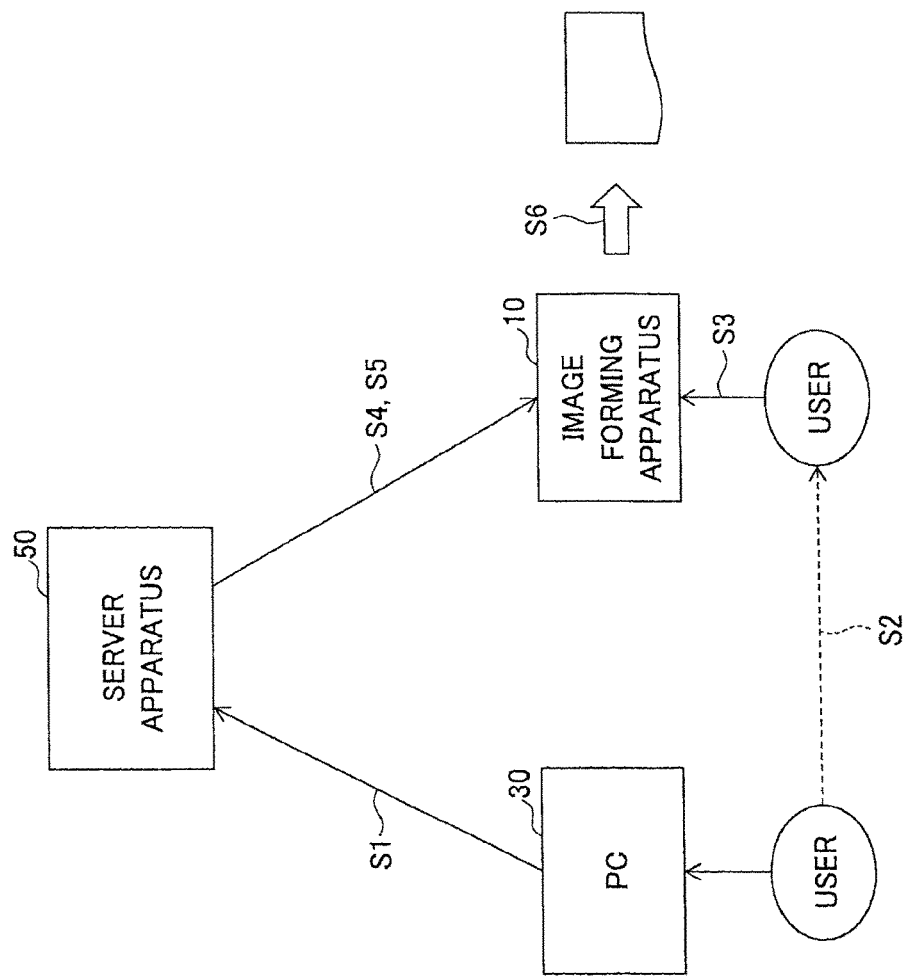

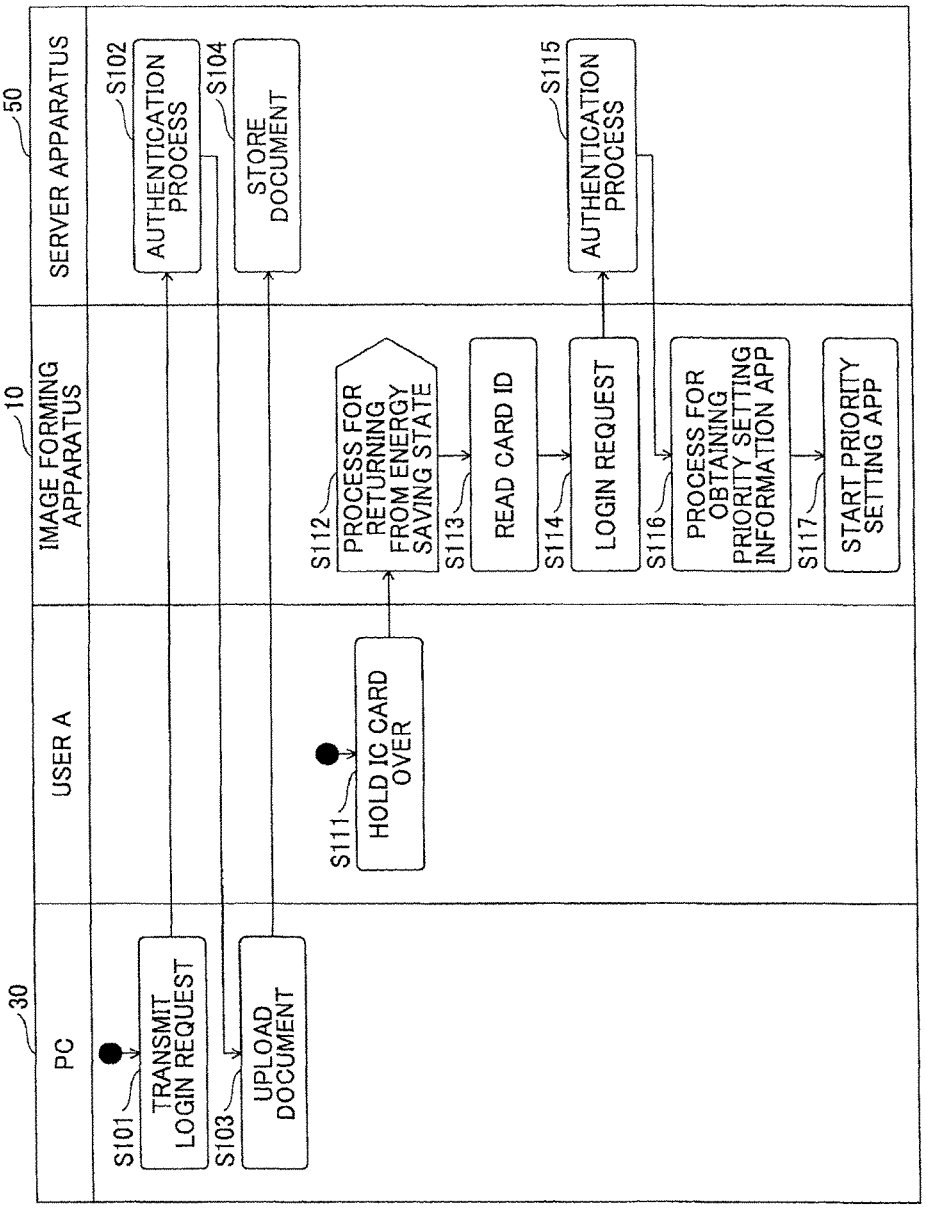

FIG.9

| DOCUMENT ID | TYPE | URI | THE NUMBER OF PAGES | SIZE | DATE AND TIME | CREATOR | FORMAT | DESTINATION |
|---|---|---|---|---|---|---|---|---|
| 1855 | REPORT | rrr.com/Hello.jpg | 1 | 1MB | 2/6 12:01 | A | jpeg | A |
| 1856 | SLIP | rrr.com/Color.pdf | 10 | 2MB | 2/6 11:50 | B | pdf | A |
| .. | .. | .. | .. | .. | .. | .. | .. | .. |

```
{ "doclist": [
            {
"file"      : "Hello.jpg",
"page"      : "1",
"DocID"     : "Doc1855"
},
            {
"file"      : "Color.pdf",
"page"      : "10",
"DocID"     : "Doc1856"
},
            {
"file"      : "Mono.doc",
"page"      : "100",
"DocID"     : "Doc1857"
}
]}
```

FIG.18

| PRIORITY RANKING | WHEREABOUTS CLASSIFICATION | URL |
|---|---|---|
| 1 | INTERNET | http://cottoncloud.com |
| 2 | INTRANET | http://10.56.60.11/coton |

| USER ID | APP NAME | URL | PRIORITY |
|---|---|---|---|
| A | CLOUD PULL PRINT | http://pullprint.com | ○ |
| | LAUNCHER | http://... | |
| | CLOUD SCAN | http://... | |
| B | .. | .. | .. |
| .. | | | |

| MACHINE NUMBER | MACHINE NAME | PANEL SIZE | COLOR REPRESENTATION | PIXEL OPERATION | STILL IMAGE | MOVING IMAGE | FONT SIZE | OPERATION METHOD |
|---|---|---|---|---|---|---|---|---|
| 1234 | COLOR IMAGE FORMING APPARATUS | 600 × 800 | 256 | × | ○ | × | 8,12 | PANEL TOUCH |
| 5678 | SIMPLE IMAGE FORMING APPARATUS | 300 × 400 | 2 | × | ○ | × | 8 | HARD KEY |

| MACHINE NUMBER | TOUCH EVENT | SCROLL | SWIPE | FLICK | ZOOM |
|---|---|---|---|---|---|
| 1234 | SINGLE | ○ | × | × | × |
| 5678 | – | – | – | – | – |

| USER ID | MACHINE NUMBER | BROWSER ID | Web APP |
|---|---|---|---|
| A | 1234 | 0123 | http://pullprint.com |
| : | : | : | : |

INFORMATION PROCESSING APPARATUS, INFORMATION PROCESSING SYSTEM, AND INFORMATION PROCESSING METHOD

BACKGROUND OF THE INVENTION

1. Field of the Invention

The disclosures herein generally relate to an information processing apparatus, an information processing system, and an information processing method.

2. Description of the Related Art

A device is known that includes an application platform and can implement an application program for controlling the device. The application platform may be changed considerably in accordance with technical innovation, marketing needs, development of a new device or the like. For example, a transition is performed from an application platform that includes an application platform interface (API) based on a programming language such as a C language and a Java (registered trademark) language to a browser based application platform. The browser based application platform is, basically, an application platform that makes a Web browser an operation environment of an application. In the browser based application platform, an application program (in the following, referred to as "Web app" as appropriate) developed by using such as HTML (HyperText Markup Language), CSS (Cascading Style Sheets), and Java script (registered trademark) operates.

In a case in which a transition of the application platform is performed, a plurality of types of application platforms may be mixedly present in a market. In such a situation, a maker of a device may be required to support all of the application platforms. In this case, for example, it is required for some application programs to similarly operate in each application platform.

However, it is not effective to develop and maintain the same application program for the plurality of the types of the application platforms.

SUMMARY OF THE INVENTION

It is a general object of at least one embodiment of the present invention to provide an information processing apparatus, an information processing system, and an information processing method that substantially obviate one or more problems caused by the limitations and disadvantages of the related art.

An embodiment provides an information processing apparatus including a conversion unit configured to convert second format data into first format data that differs from the second format data, the first format data being processable by a device connected to the information processing apparatus via a network; a first transmission unit configured to transmit the first format data converted by the conversion unit to the device; a first reception unit configured to receive, from the device, information that represents an operation to a screen displayed, based on the first format data transmitted by the first transmission unit, in a display unit of the device; and a second transmission unit configured to transmit, to the device, an instruction to execute a process defined in the second format data, the process relating to the operation represented by the information received by the first reception unit.

An embodiment also provides an information processing system comprising: a device; and an information processing apparatus connected to the device via a network. The information processing apparatus includes a conversion unit configured to convert second format data into first format data that differs from the second format data, the first format data being processable by the device connected to the information processing apparatus via a network; a first transmission unit configured to transmit the first format data converted by the conversion unit to the device; a first reception unit configured to receive, from the device, information that represents an operation to a screen displayed, based on the first format data transmitted by the first transmission unit, in a display unit of the device; and a second transmission unit configured to transmit, to the device, an instruction to execute a process defined in the second format data, the process relating to the operation represented by the information received by the first reception unit, the process relating to the operation represented by the information received by the first reception unit.

BRIEF DESCRIPTION OF THE DRAWINGS

FIGS. 5A and 5B are diagrams illustrating procedures for virtually drawing content data of a Web app;

FIG. 6 is a block diagram illustrating an example of functional configurations of a back-end unit and a front-end unit;

FIG. 7 is a diagram illustrating an overview of basic processing procedures of a cloud pull print;

FIG. 8 is a diagram illustrating an example of processing procedures executed regardless of presence/absence of compatibility with the Web app for the cloud pull print;

FIG. 9 is a table illustrating an example of a document information storage unit;

FIG. 13 is a diagram illustrating an example of document list data;

FIG. 18 is a table illustrating an example of a back-end information storage unit;

FIG. 19 is a table illustrating an example of a bookmark storage unit;

FIG. 20 is a table illustrating an example of a panel information storage unit;

FIG. 21 is a table illustrating an example of an operation specification storage unit;

FIG. 22 is a table illustrating an example of a connection information storage unit;

DESCRIPTION OF THE PREFERRED EMBODIMENTS

Figure 1:
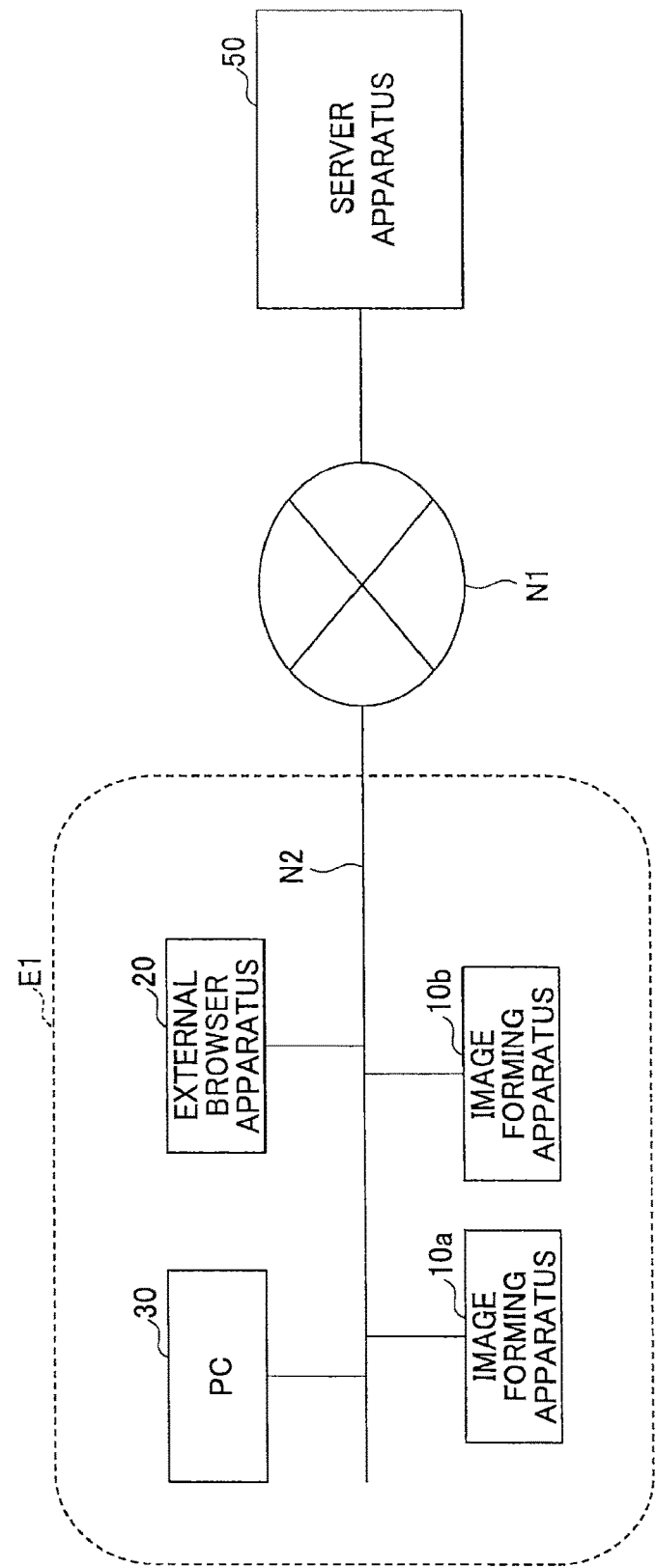
FIG. 1 is a block diagram illustrating an example of a system configuration according to an embodiment of the present invention.

In the following, embodiments of the present invention will be described with reference to the accompanying drawings. FIG. 1 is a block diagram illustrating an example of a system configuration according to an embodiment of the present invention. In FIG. 1, a user environment E1 and a server apparatus 50 are connected in a communicative manner via a network N1 such as the Internet.

The user environment E1 is a system environment in an organization such as a company. In the user environment E1, an image forming apparatus 10a, an image forming apparatus 10b (in the following, referred to as the "image forming apparatus 10" unless they are distinguished), an external browser apparatus 20 and a personal computer (PC) 30 are connected in a communicative manner via a network N2 such as an intranet in the user environment E1.

The image forming apparatus 10 is a multifunction peripheral. However, the image forming apparatus 10 is not limited to the multifunction peripheral described here. The image forming apparatus 10 may be an output device such as a printer.

In the embodiment, an application platform included in the image forming apparatus 10a differs from an application platform included in the image forming apparatus 10b. The image forming apparatus 10a is a device that includes a Web browser as an application platform. The image forming apparatus 10b is a device that includes an application platform having an application program interface (API) such as a C language or a Java (registered trademark) language. It should be noted that the image forming apparatus 10b may include an old version's Web browser. The old version's Web browser is a Web browser that does not have compatibility with one or more application programs (in the following, referred to as "Web app") that operate on the Web browser of the image forming apparatus 10a. Thus, the Web app(s) developed for the Web browser of the image forming apparatus 10a cannot directly operate in the image forming apparatus 10b. Here, the Web app is an application program which is constituted with (implemented using) HTML (HyperText Markup Language), CSS (Cascading Style Sheets), script, etc., for example. The script is a Java (registered trademark) script, for example. It should be noted that the Web browser that the image forming apparatus 10a includes, can interpret a method (in the following, referred to as "extension method") defined for control of the image forming apparatus 10a. In other words, using the extension method, the Web app for controlling the image forming apparatus 10a can be implemented. An instruction to execute printing and an instruction to execute scanning may be an example of the extension method. Here, it is effective that the latest application platform is a browser based application platform and all application programs can be provided by Web apps. However, it is not necessarily easy to secure compatibility, in an old machine, with a Web app corresponding to a Web browser installed in the latest machine. There may be a machine to which the Web browser cannot be installed or a machine in which replacement of firmware is required to activate the Web browser. This problem is common in data of a format other than the Web app. It is a general object of at least one embodiment of the present invention to resolve the incompatibility of the data format between devices.

The external browser apparatus 20 is a computer such as a personal computer (PC) in which a function to secure the compatibility of the image forming apparatus 10b with the image forming apparatus 10a is implemented. That is, the external browser apparatus 20 includes a function to make the Web App(s) for the image forming apparatus 10a usable (available) in the image forming apparatus 10b. It should be noted that the external browser apparatus may be arranged outside of the user environment E1. For example, the external browser apparatus 20 may be connected to the N1.

The PC 30 is a personal computer (PC) used by the user in the user environment E1.

The server apparatus 50 is one or more computers for providing various kinds of service to the image forming apparatuses 10. For example, the server apparatus 50 delivers a Web app that corresponds to the image forming apparatus 10a, and executes a process in cooperation with the Web app and the like. It should be noted that the server apparatus 50 may be arranged inside of the E1. For example, the server apparatus 50 may be connected to the network N2.

Figure 2:
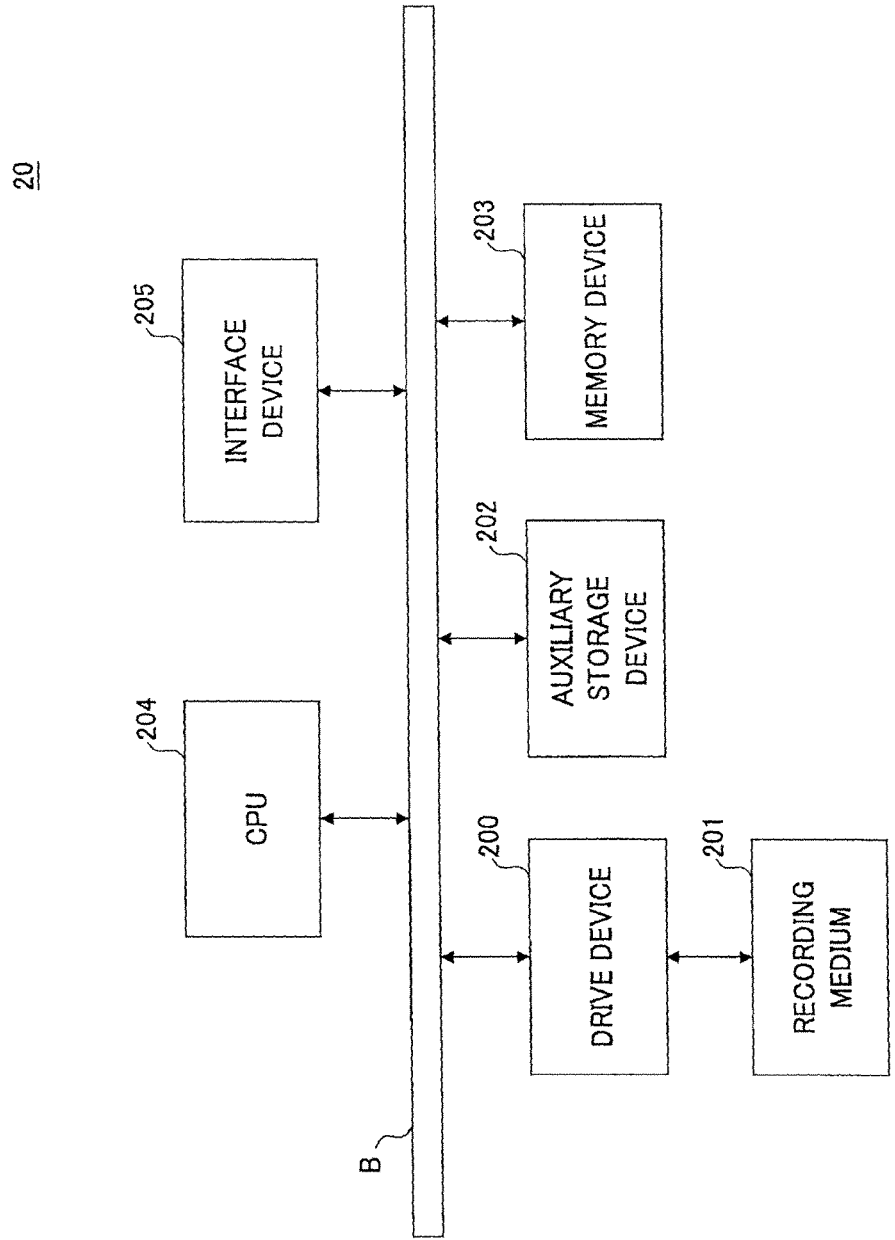
FIG. 2 a block diagram illustrating an example of a hardware configuration of an external browser apparatus according to the embodiment of the present invention.

FIG. 2 is a block diagram illustrating an example of a hardware configuration of the external browser apparatus 20 according to the embodiment of the present invention. In FIG. 2, the external browser apparatus 20 includes a drive device 200, an auxiliary storage device 202, a memory device 203, a CPU 204, and an interface device 205 that are connected to each other via a bus B.

A program that implements a process executed in the external browser apparatus 20 may be provided by a recording medium 201 such as a CD-ROM. When the recording medium 201, which stores the program, is set in the drive device 200, the program is installed into the auxiliary storage device 202 from the recording medium 201 via the drive device 200. It should be noted that installing the program may be performed by downloading the program from another computer via the network. The auxiliary storage device 202 stores the installed program, necessary files, data and the like.

The memory device 203 reads out and stores the program from the auxiliary storage device 202 in response to an instruction to start the program. The CPU 204 implements various functions of the external browser apparatus 20 according to the program stored in the memory device 203. The interface device 205 may be used for connecting the external browser apparatus 20 to the network.

It should be noted that the external browser apparatus 20 may be structured with a plurality of computers including hardware as shown in FIG. 2. That is, processes, which will be described later, executed by the external browser apparatus 20 may be executed by the plurality of computers.

Figure 3:
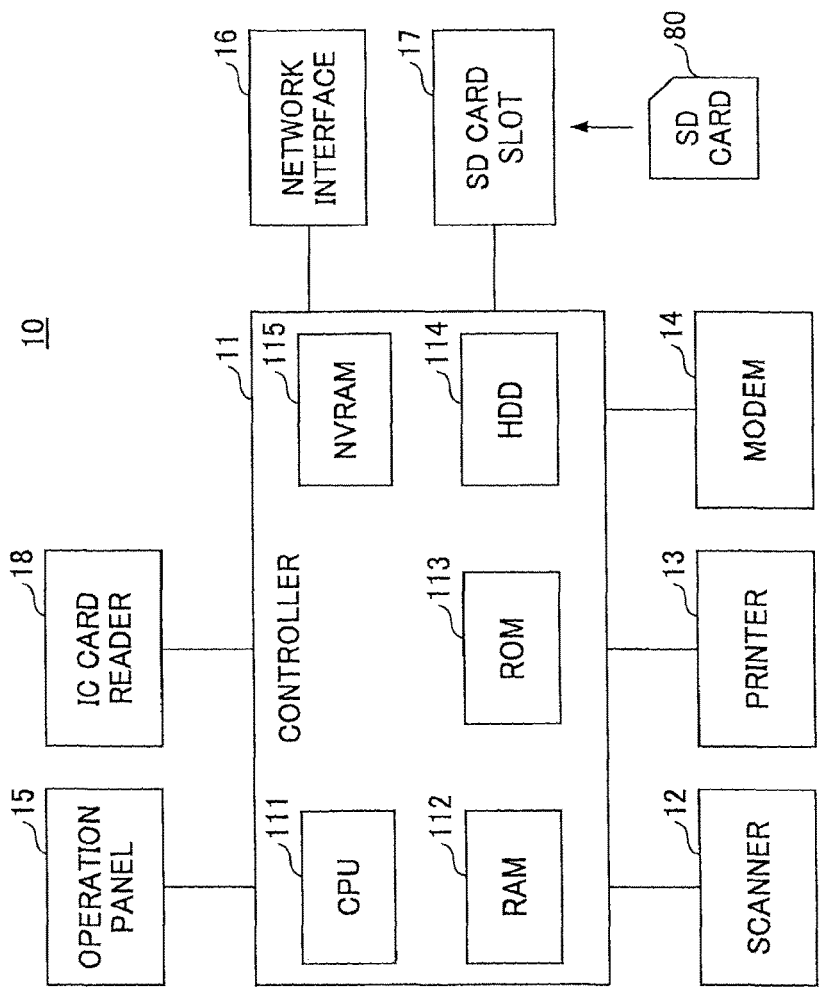
FIG. 3 is a block diagram illustrating an example of a hardware configuration of an image forming apparatus according to the embodiment of the present invention.

FIG. 3 is a block diagram illustrating an example of a hardware configuration of the image forming apparatus 10 according to the embodiment of the present invention. In FIG. 3, the image forming apparatus 10 includes hardware elements such as a controller 11, a scanner 12, a printer 13, a modem 14, an operation panel 15, a network interface 16, a SD card slot 17, and an IC card reader 18.

The controller 11 includes a CPU (Central Processing Unit) 111, a RAM (Random Access Memory) 112, a ROM (Read Only Memory) 113, a HDD (Hard Disk Drive) 114, a NVRAM (Non-Volatile Random Access Memory) 115 and the like. Various programs and data used by the programs are stored in the ROM 113. The RAM 112 is used, for example, as a storage space for loading the programs and a work space at which the loaded programs are processed. The CPU 111 implements various functions of the image forming apparatus 10 by processing the programs loaded on the RAM 112. The HDD 114 stores various programs and data used by the programs. The NVRAM 115 stores various kinds of setting information and the like.

The scanner 12 is a hardware component (image reading unit) for reading image data from a document. The printer 13 is a hardware component (printing unit) for printing print data on a printing paper (sheet). The modem 14 is a hardware component for connecting the image forming apparatus 10 to a telephone line, and is used for sending and receiving image data through facsimile communications. The operation panel 15 is a hardware component includes an input unit, a display unit and the like. The input unit may include buttons for receiving input from a user. The display unit may include a liquid crystal panel. The liquid crystal panel may include a touch panel function. The network interface 16 is a hardware component for connecting the image forming apparatus 10 to a network (wired or wireless) such as a LAN. The SD card slot 17 is used for reading programs stored in an SD card 80. According to the image forming apparatus 10, in addition to the programs stored in the ROM 113, the programs stored in the SD card 80 can be loaded into the RAM 112 and executed. It should be noted that any other recording medium (for example, a CD-ROM or a Universal Serial Bus (USB) memory) may be used instead of the SD card 80. That is, a type of a recording medium that can be mounted on the image forming apparatus 10 is not limited to the SD card 80. In this case, the SD card slot 17 may be replaced with a hardware component corresponding to the type of the recording medium. The IC card reader 18 reads card IDs from IC cards distributed to respective users. The card IDs are identification information of the respective cards. In the embodiment, the card IDs are used as identification information of the respective users.

Figure 4:
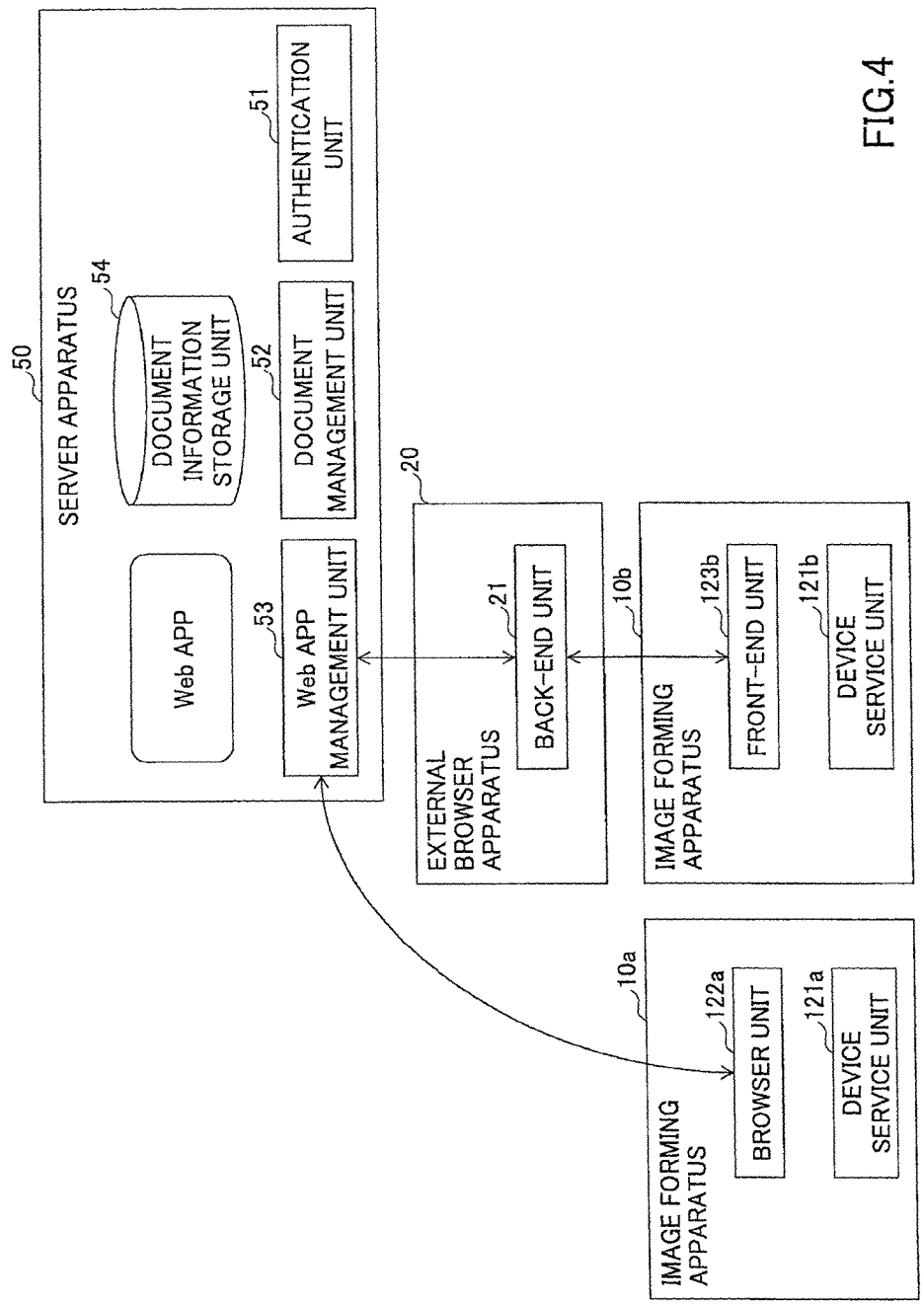
FIG. 4 is a block diagram illustrating an example of functional configurations of the apparatuses according to the embodiment of the present invention.

FIG. 4 is a block diagram illustrating an example of functional configurations of the apparatuses according to the embodiment of the present invention. As shown in FIG. 4, the server apparatus 50 includes an authentication unit 51, a document management unit 52, a Web app management unit 53, and the like. These units may be implemented by processes which are executed by a CPU of the server apparatus 50 based on at least one program installed in the server apparatus 50. Further, the server apparatus 50 stores (includes) a document information storage unit 54. For example, the document information storage unit 54 may be implemented using an auxiliary storage device of the server apparatus 50 or an auxiliary storage device being able to be connected to the server apparatus 50 via a network.

The authentication unit 51 authenticates the user who uses service provided by the server apparatus 50. The document management unit 52 manages documents whose bibliographic information is stored in the document information storage unit 54. In the present embodiment, the "document" is an abstract concept for the existence of an electronic document, image, etc. The Web app management unit 53 provides contents of the Web app and the like.

The image forming apparatus 10a includes a browser unit 122a, a device service unit 121a and the like. The browser unit 122a and the device service unit 121a may be implemented by processes that are executed by the CPU 111 of the image forming apparatus 10a based on at least one program installed in the image forming apparatus 10a. The device service unit 121a implements various functions relating to the image forming apparatus 10a. For example, the device service unit 121a provides, to the browser unit 122a, an interface (API) relating to control of the hardware of the image forming apparatus 10a. The browser unit 122a functions (serves) as the Web browser. For example, the browser unit 122a downloads content data (such as HTML, CSS, and a script) of the Web app to execute processes in accordance with definition contents of the downloaded content data.

The external browser apparatus 20 includes a back-end unit 21. The back-end unit 21 includes a Web browser having the compatibility with the browser unit 122a of the image forming apparatus 10a. That is, the back-end unit 21 can interpret the definition contents of the content data of the Web app for the image forming apparatus 10a. The back-end unit 21 analyzes the definition contents of the content data of the Web app to virtually draw the content data. The back-end unit 21 converts a virtual drawing result into a format that can be processed (interpretable) by the image forming apparatus 10b, and provides the conversion result to the image forming apparatus 10b.

The image forming apparatus 10b includes a front-end unit 123b, a device service unit 121b and the like. The device service unit 121b may be implemented by processes that are executed by the CPU 111 of the image forming apparatus 10b based on at least one program installed in the image forming apparatus 10b. The device service unit 121b implements various functions relating to the image forming apparatus 10b. For example, the device service unit 121b provides, to the front-end unit 123b, an interface (API) relating to control of the hardware of the image forming apparatus 10b. It should be noted that the interface and implemented contents of the device service unit 121a may differ from the interface and implemented contents of the device service unit 121b, respectively.

The front-end unit 123b displays a screen on the operation panel 15 based on information (conversion result) provided from the back-end unit 21b. Further, the front-end unit 123b notifies the back-end unit 21 of information that represents an operation to the displayed screen. The back-end unit performs update about the virtual drawing result of the content data of the Web app based on the notified information. The back-end unit 21 notifies the front-end unit 123b of an update result. As a result, on the image forming apparatus 10b, a display content of the screen is updated. In this way, in the embodiment, using the back-end unit 21 and the front-end unit 123b, incompatibility with the Web app in the image forming apparatus 10b can be resolved.

Next, procedures for virtually drawing the content data of the Web app in the back-end unit 21 will be described. FIGS. 5A and 5B are diagrams illustrating the procedures for virtually drawing the content data of the Web app.

FIG. 5A shows procedures for drawing the content data of the Web app by the browser unit 122a. The drawing procedures include acquisition of content data, generation of a document object model (DOM) tree, layout, painting, and the like.

The acquisition of content data is a process that obtains (downloads), from the server apparatus 50 based on the HyperText Transfer Protocol (HTTP) communication, the content data (such as HTML, CSS, and the script) of the Web app.

The generation of the DOM tree is a process that analyzes a tag of HTML data among the obtained content data to generate the DOM tree. Further, in the generation of the DOM tree, CSS data is analyzed and information relating to decoration required for displaying the screen is generated.

The layout is a process that determines positions of respective DOM elements that constitute the DOM tree.

The painting is a process that executes drawing (displaying) of the screen based on the DOM tree.

It should be noted that after completion of an initial drawing, in response to the following events (A) to (C), the DOM tree is updated and drawing contents are updated.
(A) update of style of DOM element(s) by script
(B) addition or deletion of DOM element(s) by script
(C) user operation FIG. 5B shows procedures for virtually drawing the content data of the Web app by the back-end unit 21. Similar to the drawing procedures shown in FIG. 5A, the drawing procedures shown in FIG. 5B includes, the acquisition of content data, the generation of the DOM tree and the layout but does not include the painting. That is, displaying the screen is not executed actually (however, displaying the screen may be executed). On the other hand, in the drawing procedures shown in FIG. 5B, layout conversion is executed.

In the layout conversion, for the DOM tree, conversion to data (in the following, referred to as "screen layout data") which can be interpreted by the front-end unit 123b is performed. The screen layout data can display the screen of the web app. The back-end unit 21 provides, to the front-end unit 123b, the screen layout data generated in the layout conversion. In this way, in the back-end unit 21, most of the drawing procedures executed by the browser unit 122a are executed.

The front-end unit 123b displays the screen of the Web app based on the screen layout data provided from the back-end unit 21. The front-end unit 123b notifies the back-end unit 21 of information (in the following, referred to as "operation information") that represents an operation to the screen. The back-end unit 21 performs updates the DOM tree based on the notified operation information. Thus, a format of the screen layout data is not limited specifically, as long as the front-end unit 123b can display the screen of the Web app, and operation information, which includes identification information of a DOM element corresponding to an operated display element, can be reported to the back-end unit 21 in accordance with an operation to the screen. Further, the screen layout data does not have to include information defined by the script. That is, the screen layout data does not have to include information that represents a process that should be executed corresponding to the operation of the screen. It should be noted that screen layout data may differ based on types (models) of the image forming apparatus 10.

In order to implement the drawing procedures as shown in FIG. 5, the back-end unit 21 and the front-end unit 123b include functional configurations as shown in FIG. 6.

FIG. 6 is a block diagram illustrating an example of functional configurations of the back-end unit 21 and the front-end unit 123b. As shown in FIG. 6, the back-end unit 21 includes a connection management unit 211, a browser unit 212, a browser control unit 213, a layout conversion unit 214, an operation information reception unit 215, a device service mediation unit 216 and the like. These units may be implemented by processes that are executed by the CPU 204 based on at least one program installed in the external browser apparatus 20. Further, the back-end unit 21 includes a connection information storage unit 221, a bookmark storage unit 222, a panel information storage unit 223, an operation specification storage unit 224 and the like. These storage units may be implemented using the auxiliary storage device 202 of the external browser apparatus or an auxiliary storage device being able to be connected to the external browser apparatus 20 via a network.

The back-end unit 211 manages connection relation between the front-end unit 123b and the browser unit 212. That is, a process of the browser unit 212 is started for each front-end unit 123b, because a drawing content by the browser unit 212 is different for each front-end unit 123b. Information that represents the connection relation between the front-end unit 123b and the browser unit 212 is stored in the connection information storage unit 221.

The browser unit 212 functions (serves) as the Web browser whose type is same as the browser unit 122a. That is, the browser unit 212 can interpret content data that can be interpreted by the browser unit 122a. In the drawing procedures shown in FIG. 5B, the browser unit 212 executes the procedures from the acquisition of content data to the layout. In the drawing procedures, the browser unit 212 generates a screen corresponding to the operation panel 15 of the image forming apparatus 10b. For example, the browser unit 212 draws a screen such that the screen is (fits) within a display area of the operation panel 15 of the image forming apparatus 10b. It should be noted that URLs of content data of Web apps that the browser unit 212 obtains is stored in the bookmark storage unit 222. Further the information relating to the operation panel 15 of the image forming apparatus 10b is stored in the panel information storage unit 223, the operation specification storage unit 224, and the like.

The browser control unit 213 can output the DOM tree generated by the browser unit 212 to the layout conversion unit 214 and input, to the browser unit 212, an event represented by the operation information received by the operation information reception unit 215.

The layout conversion unit 214 executes the layout conversion in the drawing procedures shown in FIG. 5B. The layout conversion unit 214 transmits, to the front-end unit 123b, the screen layout data generated by the conversion. In other words, the layout conversion unit 214 can convert second format data into first format data processable by the image forming apparatus 10b, and transmit the first format data to the image forming apparatus 10b.

The operation information reception unit 215 receives information that represents an operation to the screen, displayed in the front-end unit 123b based on the screen layout data, and converts the operation information into event information that can be interpreted by the browser unit 212.

The device service mediation unit 216 functions (serves) as an emulator of the device service unit 121a. By the device service mediation unit 216 functioning as the emulator of the device service unit 121a, the browser unit 212 can input, to the device service mediation unit 216, a process instruction to the image forming apparatus 10b via an interface that is the same interface provided by the device service unit 121a and that the browser unit 122a uses. For example, the device service mediation unit 216 receives an instruction output from the browser unit 212 to the image forming apparatus 10 to execute a process based on a definition of a script, and transmits, to a device service disclosure unit 134 of the front-end unit 123b, the received instruction to execute the process. In other words, the device service mediation unit 216 transmits, to the image forming apparatus 10b, the instruction to execute the process relating to the operation, performed to the screen of the image forming apparatus 10b, interpreted by the operation information reception unit 215.

On the other hand, the front-end unit 123b includes a use request unit 131, a layout reception unit 132, an operation information transmission unit 133, the device service disclosure unit 134 and the like. These units may be implemented by processes that are executed by the CPU 111 of the image forming apparatus 10b based on at least one program installed in the image forming apparatus 10b. Further, the front-end unit 123b uses a back-end information storage unit 135. For example, the back-end information storage unit 135 may be implemented by using the HDD 114 of the image forming apparatus 10b.

The use request unit 131 transmits, to the back-end unit 21, a use request for using the back-end unit 21. Identification information of the back-end unit 21 that is a transmission destination of the use request is stored in the back-end information storage unit 135. The layout reception unit 132 receives the screen layout data transmitted from the layout conversion unit 214 of the back-end unit 21, and displays the screen on the operation panel 15 based on the received the screen layout data. The operation information transmission unit 133 transmits, to the back-end unit 21, operation information that represents an operation to the screen displayed by the layout reception unit 132. The operation information includes identification information of a display element set as an operation object and information that represents a classification of the operation. The device service disclosure unit 134 discloses an interface (API) for making functions of the device service unit 121b callable via the network.

In the following, processing procedures executed by the image forming apparatus 10 and the external browser apparatus 20 will be described. According to the present embodiment, as a specific example of the Web app, a Web app for providing a service called "a cloud pull print" is used. It should be noted that a name of "the cloud pull print" is for the sake of convenience and is not intended to limit contents of the service.

FIG. 7 is a diagram illustrating an overview of a basic processing procedure of the cloud pull print. For example, in step S1, a user logs into the server apparatus 50 from the PC 30 and uploads a file (in the following, referred to as the "data file") that contains actual data of a document saved in the PC 30 to the server apparatus 50. Then, the user moves to any of the image forming apparatuses 10 in step S2, and logs into the image forming apparatus 10 in step S3. When use of a cloud pull print service is instructed by the user after the login, or in response to the login, the image forming apparatus 10 obtains (downloads) a list of documents uploaded to the server apparatus 50 and displays the obtained list on the operation panel 15 in step S4. When the document to be printed is selected from the list by the user, the image forming apparatus 10 obtains (downloads) a data file of the selected document from the server apparatus 50 in step S5 and prints the obtained data file in step S6.

According to the cloud pull print as described above, for example, a user can cause the image forming apparatus 10 installed in an office to print a document saved in a PC, a mobile terminal, etc., without using an in-house LAN in a company to which the user belongs. For example, the user can upload a document to be printed from a home, a place where the user has gone on the road, or the like.

A user who uploads the document and a user who causes the image forming apparatus 10 to print the documents do not have to be the same person. For example, if a user B has authority to access the document uploaded by a user A, the user B may instruct to perform the printing.

FIG. 8 is a diagram illustrating an example of processing procedures executed regardless of presence/absence of the compatibility with the Web app for the cloud pull print. That is, FIG. 8 shows the processing procedures commonly executed for the cloud pull print regardless of whether an output destination is the image forming apparatus 10a or the image forming apparatus 10b. It should be noted that FIG. 8 describes an example in which a user A uploads a document using the PC 30 and the user A instructs to print the document. However, the printing instruction to print the document may be performed by another user other than the user A. In the following, the image forming apparatus 10 which the user A operates may be referred to as the "target device".

As an initial state, a login screen to the server apparatus 50 is displayed on the PC 30. For example, the log in screen may be displayed based on a Web page downloaded from the server apparatus 50. It should be noted that a web browser of the PC 30, for example, may cause the PC 30 to execute the process executed by the PC 30 shown in FIG. 8.

In step S101, when the user A inputs, a user ID, and a password into the login screen displayed on the PC 30, the PC 30 transmits a login request including the password, and the user ID to the server apparatus 50. The authentication unit 51 of the server apparatus 50 executes an authentication process on the password, and the user ID included in the login request in step S102.

In a case in which authentication fails, the subsequent process is stopped. In a case in which authentication succeeds, the authentication unit 51 generates a ticket (cookie) that shows a success of the login, and returns (transmits), to the PC 30, the ticket, and a Web page on which an upload screen is displayed. It should be noted that in the server apparatus 50, the ticket is stored in association with the user ID of the authenticated user. Further, a ticket is included in the subsequent requests from the PC 30. Therefore, the server apparatus 50 may specify the user IDs related to the requests from the respective PCs 30 based on tickets included in the requests.

The upload screen is a screen for selecting a document to be uploaded, a destination of the document, and the like. The destination of the document means a user or a group that is allowed to access the document. The group is a concept with respect to a group to which a plurality of users belong such as a department, for example.

The PC 30 that receives the Web page displays the upload screen. When the document to be uploaded, the destination of the document, etc., are selected via the upload screen by the user A, the PC transmits (uploads) the data file of the selected document to the server apparatus 50 in step S103. In response to receiving the data file, the document management unit 52 of the server apparatus 50 stores the received data file in the auxiliary storage device 202, for example, and stores bibliographical information of the document related to the received data file in the document information storage unit 54 in step S104.

FIG. 9 is a table illustrating a configuration example of the document information storage unit 54. In FIG. 9, the document information storage unit 54 stores bibliographical information including document IDs, document types, URIs, the numbers of pages, sizes, dates and times, creators, formats, destinations, and the like, for the respective uploaded documents.

The document ID is identification information of the corresponding document. The document type is a type of document when the respective documents are classified from a viewpoint of a user operation. The document type may be a report or a slip (receipt). The URI is information representing a storage location of a data file of the document in the server apparatus 50. The URI includes a file name at the end part. The size is a data size of the data file. The date and time is a date and time at which the document is uploaded, or in other words, a date and time at which the document is received by the document management unit 52. If it is information indicating a time (timing) at which the document is uploaded, information other than the date and time may be used instead of the date and time. The creator is the user ID of the user who uploads the document. That is, it is the user ID of the log user related to the upload request of the document. The format is a data format of the data file. The destination is a destination of the document. In other words, the destination is a user or a department, etc., which include an access authority for the document. In a case in which the destination is the department, an access authority is provided to users who belong to the department.

It should be noted that the document ID is automatically allocated by the document management unit 52. The URI, the size, the date and time, the creator, and the format are determined automatically by the document management unit 52. The document type and the destination are included in the upload request. For example, the document type and the destination are designated by the user A in the upload screen.

Then, when the user A holds the IC card over the IC card reader 18 of the target device in step S111, the target device returns from an energy saving state in step S112. Next, the device service unit 121 of the target device controls reading of the card ID from the IC card in step S113. Next, the device service unit 121 of the target device transmits the login request including the card ID to the server apparatus 50 in step S114. The authentication unit 51 of the server apparatus 50 executes an authentication process on the card ID included in the login request in step S115. More specifically, if a record including the user ID is stored in association with the card ID, it is determined that the authentication is successful. In a case in which the authentication fails, the subsequent process is stopped. In a case in which the authentication succeeds, the server apparatus 50 returns (transmits), to the target device, a response including the user ID corresponding to the card ID while indicating the success of the authentication. The device service unit 121 of the target device stores the user ID included in the response, in the RAM 112 for example, as the user ID of the login user.

Next, the device service unit 121 of the target device executes an obtaining process for obtaining priority setting app information on the authenticated user A in step S116. The priority setting app, which is an application to be operated first (to be displayed first) after the image forming apparatus 10 is started, is set for each user ID. The priority setting app information is information that represents a priority setting app. Next, the device service unit 121 starts a priority setting app based on the priority setting app information set for the user ID of the login user in step S117.

Subsequent processing procedures of a case in which the image forming apparatus 10a, which includes the compatibility with the Web apps, is the target device differs from subsequent processing procedures of a case in which the image forming apparatus 10b, which does not include the compatibility with the Web apps, is the target device. Thus, they will be described individually.

Figure 10:
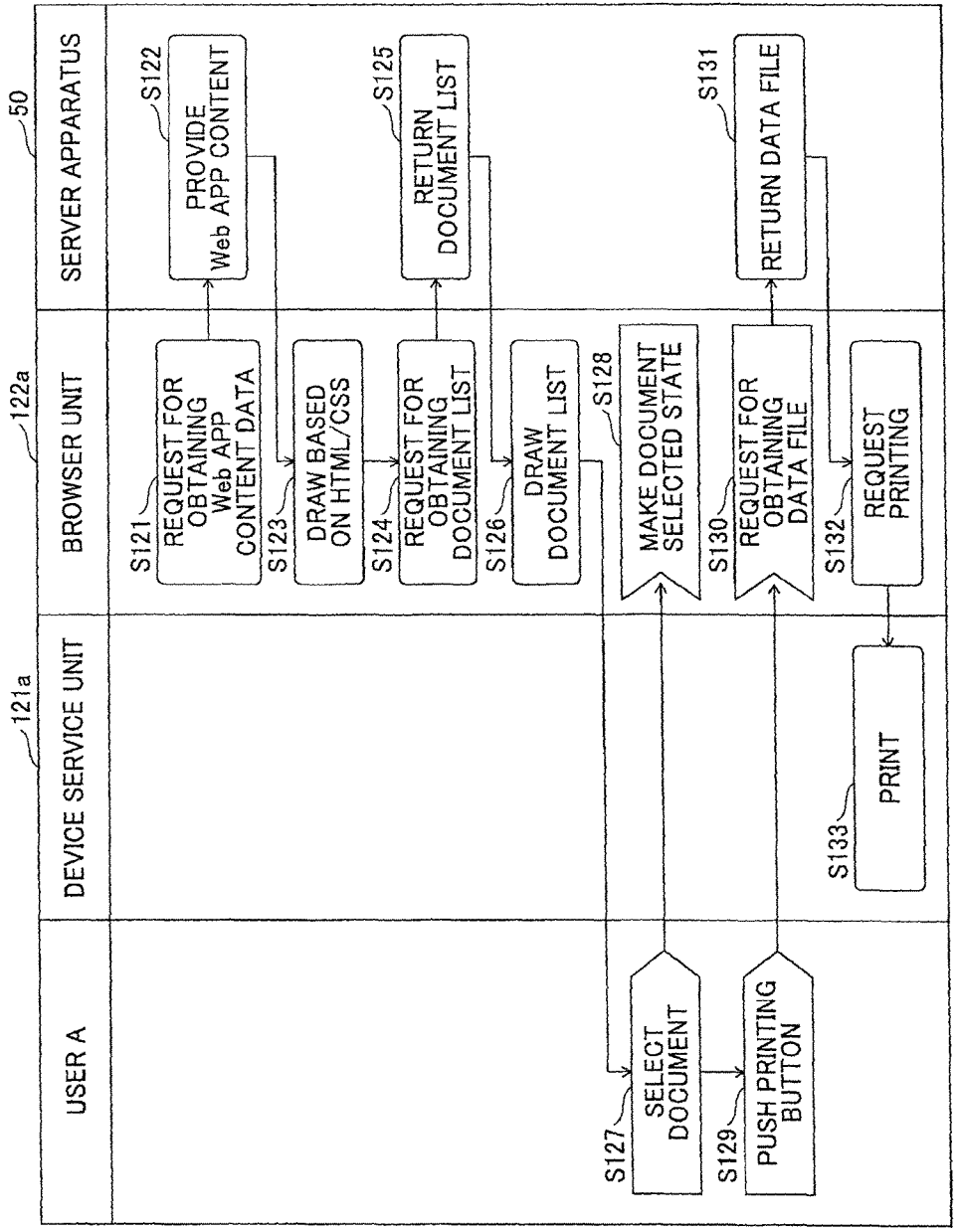
FIG. 10 is a diagram illustrating processing procedures in which the image forming apparatus, which includes the compatibility with the Web app, executes the Web app of the cloud pull print.

FIG. 10 is a diagram illustrating processing procedures in which the image forming apparatus 10a, which includes the compatibility with the Web app, executes the Web app of the cloud pull print.

In a case in which the target device is the image forming apparatus 10a, the priority setting application information is a URL of the Web app corresponding to the cloud pull print. Thus, in step S117 shown in FIG. 8, the device service unit 121a starts the browser unit 122a while designating the URL.

When being started, the browser unit 122a transmits, to the server apparatus 50 in step S121, an obtaining request for obtaining the content data of the Web app related to the URL. In response to the obtaining request, the server apparatus 50 transmits (returns) the content data of the Web app of the cloud pull print in step S122. For example, the HTML, the CSS, the script, and the like constituting the Web app is transmitted.

Subsequently, in step S123, based on the HTML and the CSS included in the transmitted content data, the browser unit 122a executes a drawing process about a static part of a document list screen. The document list screen is a screen in which a list of documents uploaded on the server apparatus 50 is displayed.

Figure 11:
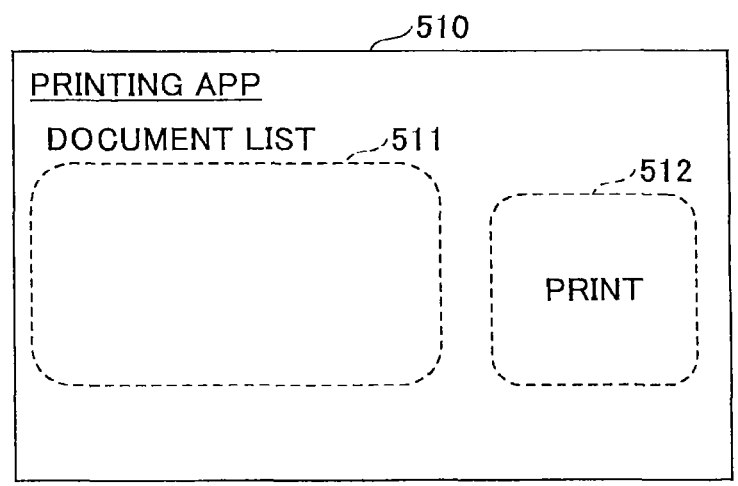
FIG. 11 is a diagram illustrating an example of a static part of a document list screen.

FIG. 11 is a diagram illustrating an example of the static part of the document list screen 510. As shown in FIG. 11, the document list screen 510 includes a document list display area 511, a print button 512 and the like. The document list display area 511 is an area in which the list of the documents is to be displayed. However, the list of the documents is not included in FIG. 11. This is because the list of the documents is a dynamic part that differs (changes) based on the documents being uploaded on the server apparatus 50. That is, this is because the list of the documents is a part that cannot be defined in advance as static content data of the Web app. The print button 512 is a button for receiving an instruction to print one or more documents selected in the document list display area 511. It should be noted that, in a state shown in FIG. 11, because the list of the documents are not displayed (that is, it is in a state in which an instruction to print the document cannot be received), the print button 512 is grayed out and in an inoperable state. That is, in FIG. 11, the print button 512 represented by a broken line represents that the print button 512 is grayed out, for example.

Figure 12:
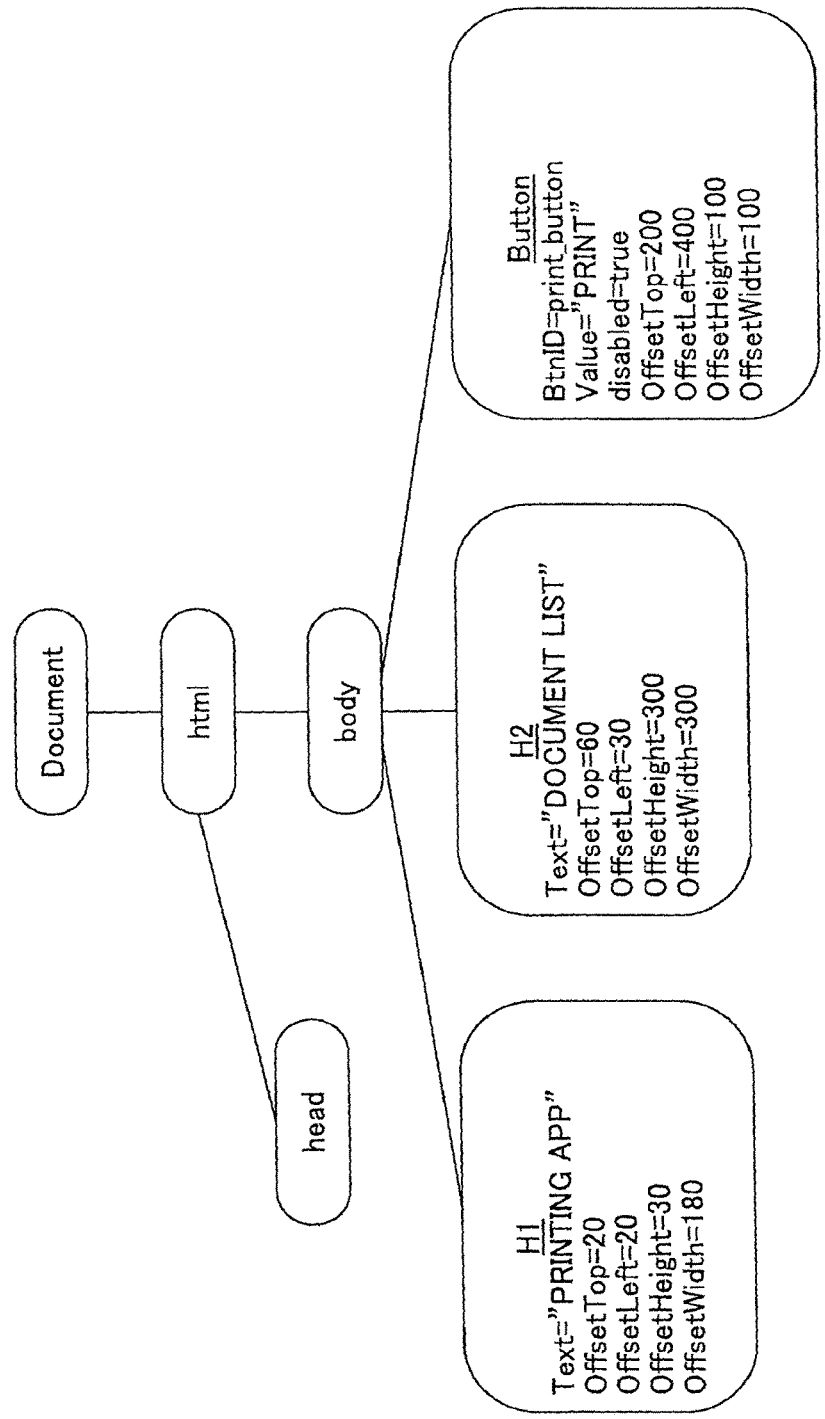
FIG. 12 is a diagram illustrating an example of a DOM tree corresponding to the static part of the document list screen.

It should be noted that the document list screen 510 is generated based on a DOM tree as shown in FIG. 12, for example. In other words, based on the content data of the Web app, the browser unit 122a generates the DOM tree as shown in FIG. 12 to draw the document list screen 510 based on the generated DOM tree.

FIG. 12 is a diagram illustrating an example of the DOM tree corresponding to the static part of the document list screen 510. Respective nodes constituting the DOM tree represent DOM elements. In FIG. 12, a body node is a DOM element corresponding to a body of a HTML document. A H1 node and a H2 node are DOM elements corresponding to headlines. The H1 node corresponds to a headline "printing app", and the H2 node corresponds to a headline "document list". It should be noted that levels of the headline are h1 to h6, and h1 is the largest headline. A Button node is a DOM element corresponding to the print button 512. In the Button node, "true" is set in a value of "disabled"

that is an attribute representing validity/invalidity of the operation (whether an operation can be performed). Here, attributes starting from "Offset" are added to the H1 node, the H2 node, and the Button node. The attributes starting from "Offset" are layout information items that represents arranging positions of display elements corresponding to the respective DOM elements, and added in the layout shown in FIG. 5.

Subsequently, based on the script constituting the content data of the Web app of the cloud pull print, the browser unit 122a transmits, to the server apparatus 50 in step S124, an obtaining request for obtaining the list of the documents related to the user A. That is, the script includes a definition representing that the list of the documents relating to the user A should be obtained when the Web app is displayed. It should be noted that the transmitted obtaining request includes the user ID of the login user. In response to the obtaining request, for example, the document management unit 52 of the server apparatus 50 obtains, from the document information storage unit 54, a list of bibliographic information of the documents (in the following, referred to as the "document list") in which the user ID included in the obtaining request is set as the destination, among documents stored in the server apparatus 50, and returns (transmits) data that represents the obtained list (in the following, referred to as the "document list data") in step S125.

FIG. 13 is a diagram illustrating an example of the document list data. In FIG. 13, an example is shown in which the document list described in a JavaScript (registered trademark) Object Notation (JSON) format.

In FIG. 13, the document list data includes, for the respective documents, values of files, pages and DocIDs. The file represents a file name of the document. The page represents the number of pages of the document. The DocID represents a document ID that is identification information of the document.

Subsequently, based on the script constituting the Web app of the cloud pull print and the obtained document list data, the browser unit 122a updates the DOM tree relating to the document list screen 510 to perform a drawing process for the updated part in step S126. As a result, the DOM shown in FIG. 12 is updated as shown in FIG. 14.

Figure 14:
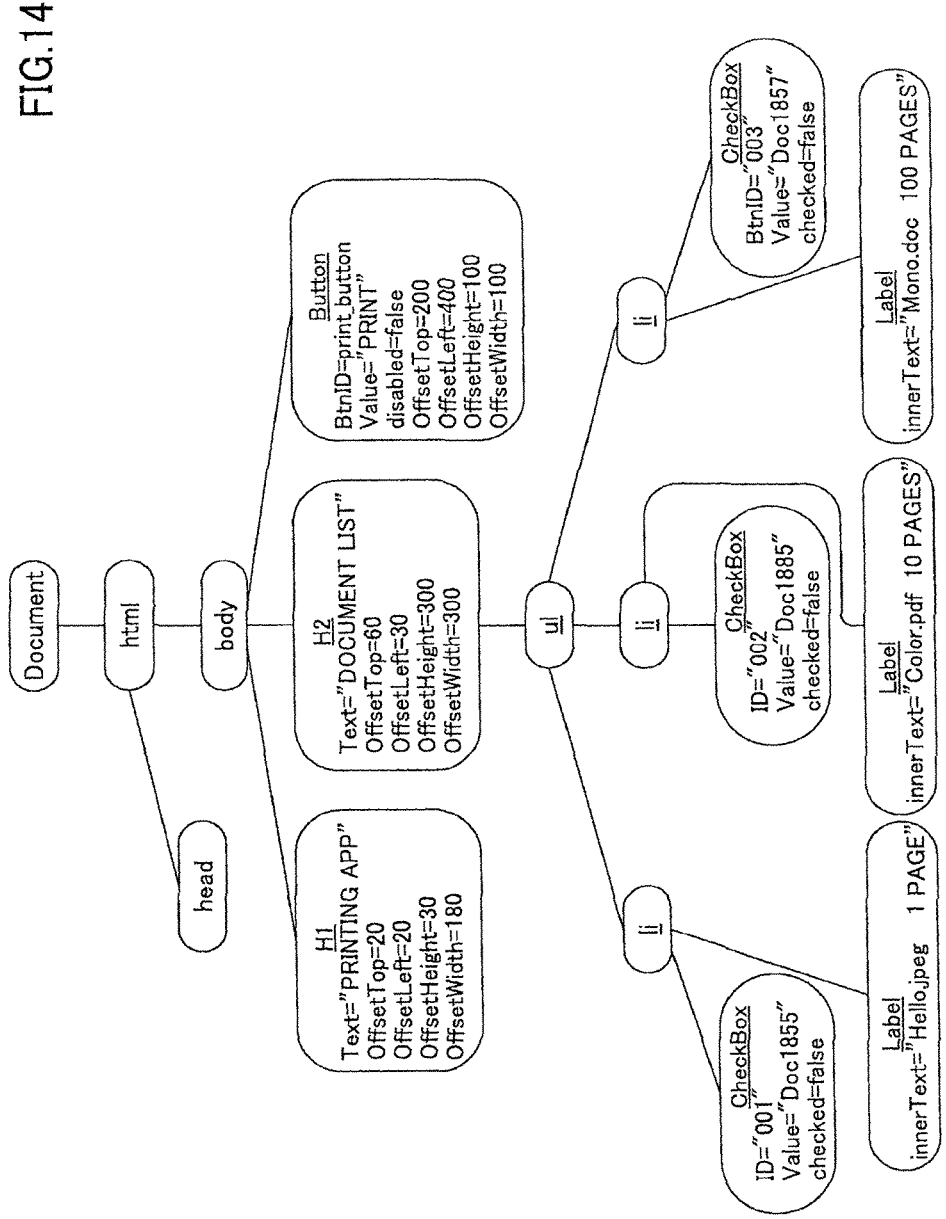
FIG. 14 is a diagram illustrating an example of the DOM tree of the document list screen updated based on the document list data.

FIG. 14 is a diagram illustrating an example of the DOM tree of the document list screen updated based on the document list data.

In FIG. 14, nodes following an ul node are added. The ul node represents "Unordered List" (unordered list). Here, the unordered list is the document list. A li node that is a child node of the ul node represents "List Item" (list item). Here, the documents included in the document list correspond to the respective list items. Each of the li nodes includes a CheckBox node and a Lable node as a child node. The CheckBox node indicates Input.CheckBox and includes a Checked attribute representing selection/non-selection of the list item. In a case in which the list item is selected, a value of the Checked attribute of the CheckBox node corresponding to the selected list item becomes "true". In a case in which the selection of the list item is cancelled (deselected), a value of the Checked attribute of the CheckBox node corresponding to the deselected list item becomes "false". A value of an ID attribute of the CheckBox node is identification information for identifying a checkbox. An arbitrary value is allocated to the value of the ID attribute when the DOM tree is generated. In a value of a Value attribute of the CheckBox node, the document ID of the document corresponding to the list item is set. A label element includes a character string displayed in the list item.

Here, a character string including a file name and the number of pages is set as a display object.

Figure 15:
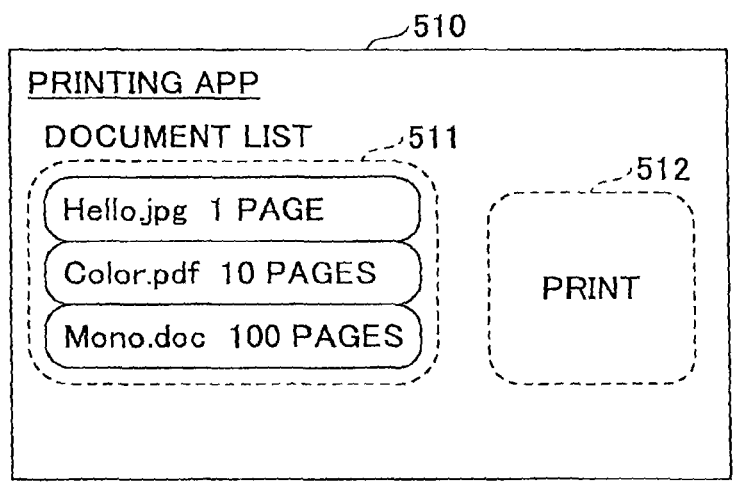
FIG. 15 is a diagram illustrating an example of the document list screen in which the document list is drawn.

By updating the DOM tree as shown in FIG. 14 and executing the drawing process, the document list screen 510 is updated as shown in FIG. 15.

FIG. 15 is a diagram illustrating an example of the document list screen 510 in which the document list is drawn. As shown in FIG. 15, the document list (list of the documents) is displayed in the document list displaying area 511 of the document list screen 510.

Subsequently, when the user A selects in step S127, from list items included in the document list display area 511, one or more list items corresponding to the documents to be printed, in the DOM tree, the browser unit 122a sets values of the Checked attributes of the CheckBox nodes corresponding to the selected list items as "true", and sets a value of the disable attribute of the Button node as "false" in step S128. As a result, display statuses of the list items and the print button 512 are changed.

Figure 16:
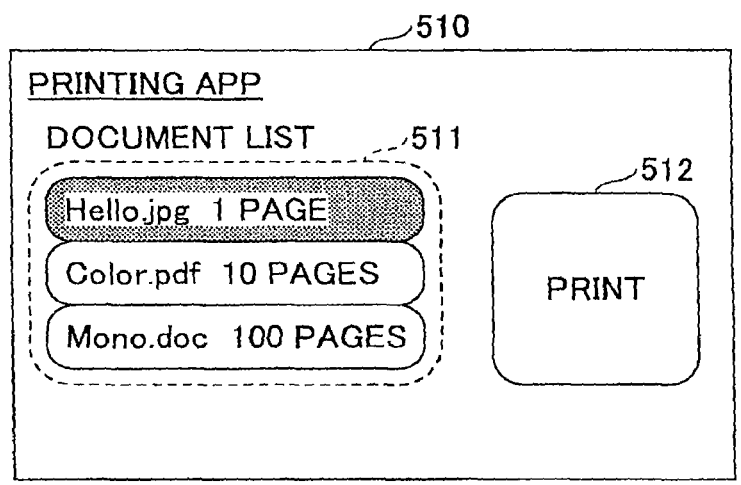
FIG. 16 is a diagram illustrating a state in which a document is selected.

FIG. 16 is a diagram illustrating a state in which the document is selected. In FIG. 16, an example is shown in which the list item of the first row (document whose file name is "Hello.jpg") is selected. Further, in FIG. 16, the print button 512 is changed to an operable state.

Subsequently, when the user A pushes the print button 512 in step S129, the browser unit 122a transmits in step S130, to the server apparatus 50, an obtaining request for obtaining a data file relating to the selected document based on the script constituting the Web app of the cloud pull print. The obtaining request includes the value (that is, the document ID) of the Value attribute of the CheckBox node whose value of the Checked attribute is "true".

The document management unit 52 of the server apparatus 50 obtains, from the auxiliary storage device 202 for example, the data file relating to the document ID included in the transmitted obtaining request, and returns (transmits) the obtained data file to the target device in step S131. The data file relating to the document ID can be specified based on the URI stored in the document information storage unit 54 in association with the document ID. It should be noted that in a case in which a format of the data stored in the data file is a non-printable format in the target device, the data file may be returned after a conversion process for converting to a printable format by the target device is executed.

It should be noted that the date file returned to the target device is not limited to a file format. That is, a wording "file" is used for the sake of convenience and is not intended to limit a data format of the document to the file format.

When the target device receives the data file, the browser unit 122a requests the device service unit 121a to print the received data file in step S132 based on the execution instruction of the printing defined in the script constituting the Web app of the cloud pull print. In response to the request, the device service unit 121a executes a print job relating to the data file in step S133. As a result, the document selected by the user A in the document list screen 510 is printed.

Next, processing procedures of a case in which the target device in FIG. 8 is the image forming apparatus 10b, which does not include the compatibility with the Web app.

Figure 17:
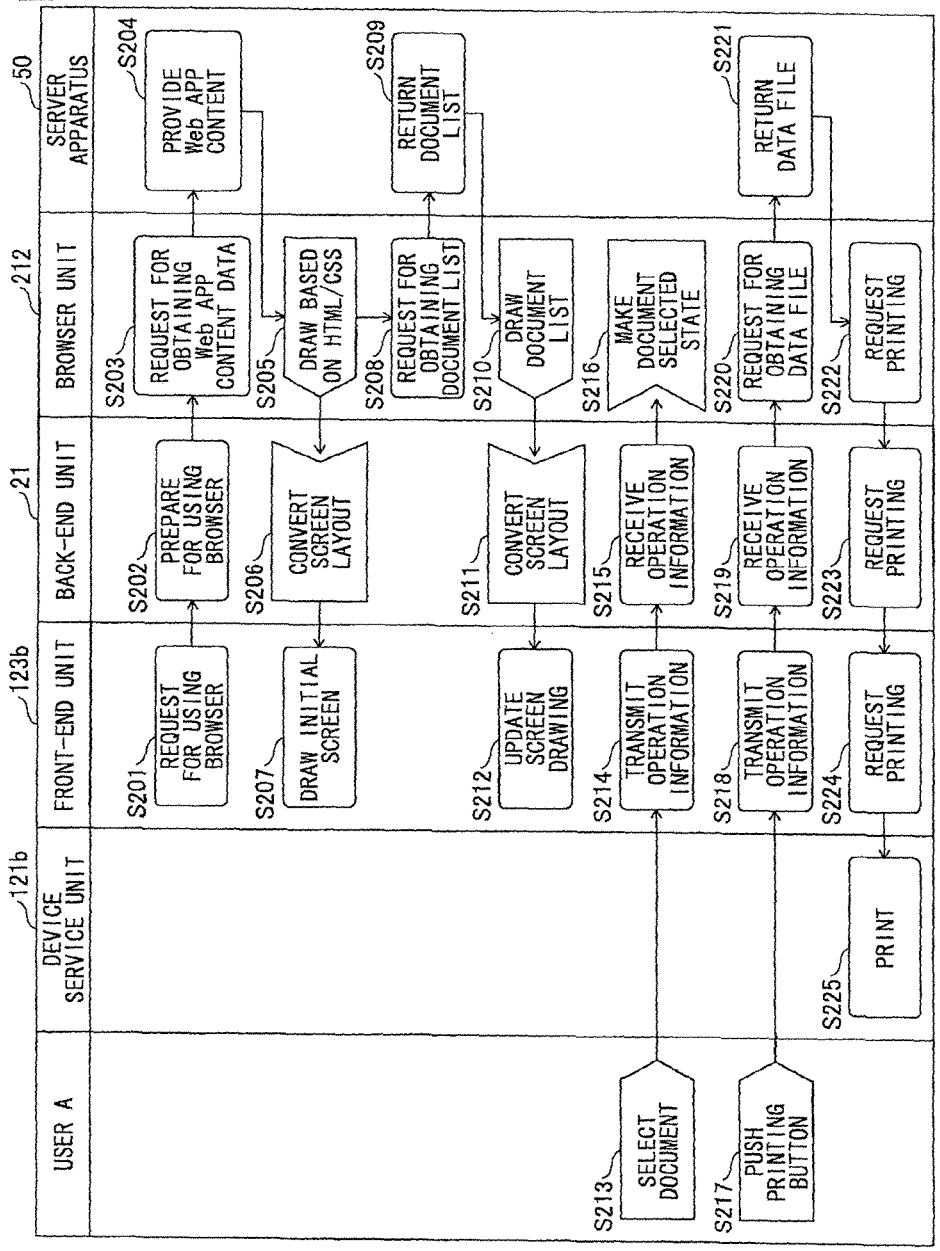
FIG. 17 is a diagram illustrating processing procedures in which the image forming apparatus, which does not include the compatibility with the Web app, executes the Web app of the cloud pull print.

FIG. 17 is a diagram illustrating processing procedures in which the image forming apparatus 10b, which does not include the compatibility with the Web app, executes the Web app of the cloud pull print.

In a case in which the target device is the image forming apparatus 10b, the priority setting app information is information that represents the front-end unit 123b. Thus, in step S117 shown in FIG. 8, the device service unit 121*b* starts the front-end unit 123*b*. Subsequently, the use request unit 131 of the front-end unit 123*b* transmits, to the back-end unit 21, a use request for using a browser in step S201. A transmission destination of the use request for using the browser is specified by referring to the back-end information storage unit 135 of the image forming apparatus 10*b*.

FIG. 18 is a table illustrating an example of the back-end information storage unit 135. As shown in FIG. 18, the back-end information storage unit 135 stores, for each back-end unit 21 that is a candidate for a connection destination, a priority ranking, a whereabouts classification, an URL and the like. The priority ranking is a ranking of priority of each candidate. A candidate ("INTRANET" in FIG. 18) whose priority ranking is low is set as a connection destination in a case in which connection to a candidate ("INTERNET" in FIG. 18) whose priority ranking is high fails. The whereabouts classification is information that represents whether a location of each back-end unit 21 is within an intranet or on the Internet. The URL is an URL for each back-end unit 21.

It should be noted that the use request transmitted to the back-end unit 21 in step S201 includes the user ID of the login user, and identification information (in the following, referred to as the "machine number") of the machine of the image forming apparatus 10*b*. Further, in a case in which the front-end unit 123*b* differs for each type (model) or a plurality of version's front-end units 123*b* are present, identification information that represents a classification of the front-end unit 123*b* may be included in the use request. In other words, a plurality of image forming apparatuses 10 can be connected to the external browser apparatus 20 via the network, and the back-end unit 21 receives identification of one (first device) of the image forming apparatuses 10 that makes the use request.

When the connection management unit 211 of the back-end unit 21, as the destination of the use request for using the browser, receives the use request, the connection management unit 211 executes a preparation process for using the browser unit 212 in step S202. In the preparation process, the Web app to be obtained (downloaded) is specified with reference to the bookmark storage unit 222.

FIG. 19 is a table illustrating an example of the bookmark storage unit 222. As shown in FIG. 19, the bookmark storage unit 222 stores, in association with each user ID that is identification information of the user, application names of Web apps usable by the user, URLs, and information representing whether the Web app is the priority setting app.

In the preparation process in step S202, the URL of the priority setting app corresponding to the user ID included in the use request for using the browser is specified with reference to the bookmark storage unit 222. The bookmark storage unit 222 shown in FIG. 19 stores that the application name of the priority setting app of the user A is the "CLOUD PULL PRINT". "CLOUD PULL PRINT" is an application name corresponding to the cloud pull print. Thus, the URL corresponding to the cloud pull print is specified.

It should be noted that the URL of the Web app may be included in the use request for using the browser and may be transmitted from the target device.

Further, in the preparation process in step S202, display performance and an operability of the operation panel 15 of the target device are specified with reference to the panel information storage unit 223 and the operation specification storage unit 224. In other words, information, associated with the identification information of the image forming apparatus 10, that represents the display performance and the operability of the operation panel 15 is used to draw the screen such that the screen fits within the operation panel 15.

FIG. 20 is a table illustrating an example of the panel information storage unit 223. As shown in FIG. 20, the panel information storage unit 223 stores, for the respective machines of the image forming apparatuses 10, values of items of machine numbers, machine names, panel sizes, color representations, pixel operations, still images, moving images, font sizes, and operation methods.

The machine numbers are identification numbers of the respective machines of the image forming apparatuses 10. The machine name is a name given to the machine. The panel size is a size that indicates an area of a crystal panel (display area) in the operation panel 15. The color representation is the number of colors available (displayable) in the crystal panel. The pixel operation is information that represents validity/invalidity of drawing figures (vector data). In other words, it indicates whether figures can be drawn. The still image is information that represents validity/invalidity of displaying image data of a still image. In other words, it indicates whether a still image can be displayed. The moving image is information that represents validity/invalidity of displaying image data of a moving image. In other words, it indicates whether a moving image can be displayed. The font size is information that represents a size of displayable fonts. The operation method is information that represents an operation method to a liquid crystal panel.

FIG. 21 is a table illustrating an example of the operation specification storage unit 224. As shown in FIG. 21, the panel information storage unit 223 stores, for the respective machines of the image forming apparatuses 10, values of items of touch events, scrolls, swipes, flicks, zooms and the like.

The touch event represents an event of a detectable touch. The scroll, the swipe, the flick, and the zoom represent validity/invalidity of the respective operations (whether respective operations can be performed). That is, information stored in the operation specification storage unit 224 is an example of information that represents, for each machine, an operation receivable by the operation panel 15 of the corresponding machine.

It should be noted information on the target device stored in the panel information storage unit 223 or the operation specification storage unit 224 may be included in the use request for using the browser and transmitted from the target device.

In the preparation process in step S202, with reference to the panel information storage unit 223, a process of the browser unit 212 (Web browser) is started in a window size corresponding to a panel size related to the target device. In the started browser unit 212, a font size corresponding to the target device is set. Further, in a case in which it is impossible to display a moving image, the browser unit 212 is set in order to make the moving image non-display. Moreover, the URL of the Web app specified with reference to the bookmark storage unit 222 is set in the browser unit 212.

In this state, the connection management unit 211 stores, in the connection information storage unit 221, information for managing connection relation between the front-end unit 123*b* and the back-end unit 21.

FIG. 22 is a table illustrating an example of the connection information storage unit 221. As shown in FIG. 22, the connection information storage unit 221 stores, for respective starting units (processes) of the browser unit 212, user IDs, machine numbers, browser IDs, Web apps and the like.

The user ID is a user ID of the user who uses the corresponding starting unit. The machine number is a machine number of the image forming apparatus 10 that includes the front-end unit 123b corresponding to the starting unit. The browser ID is identification information of the corresponding starting unit. For example, a process ID may be used as the browser ID. The Web app is a URL of the Web app that is set as a drawing object in the corresponding starting unit.

Subsequently, the browser unit 212 transmits, to the server apparatus 50 in step S203, an obtaining request for obtaining the content data of the Web app related to the set URL. In response to the obtaining request, the Web app management unit 53 of the server apparatus 50 returns (transmits) the content data of the Web app of the cloud pull print in step S204. For example, the HTML, the CSS, the script and the like constituting the Web app are transmitted. Subsequently, in step S205, based on the HTML and the CSS included in the transmitted content data, the browser unit 212 executes a drawing process for a static part of a document list screen, and notifies the browser control unit 213 of completion of the drawing process. It should be noted that as descried in FIG. 5, the painting is not executed in the drawing process. Accordingly, the DOM three shown in FIG. 12 is generated. Further, the browser unit 212 executes the drawing process such that the screen of the Web app fits within an own window size. Here, the window size corresponds to a size of the liquid crystal panel of the operation panel 15 of the target device. Thus, arranging positions of the respective DOM elements (respective display elements) in the DOM tree of the screen ares values determined in a state in which the screen fits in the liquid crystal panel.

When the browser control unit 213, which receives the notification of the completion of the drawing process, obtains the DOM tree (shown in FIG. 12) from the browser unit 212 and inputs the obtained DOM tree in the layout conversion unit 214, the layout conversion unit 214 converts the input DOM tree into the screen layout data that corresponds to the target device in step S206. As described in FIG. 5, the format of the screen layout data is not limited specifically. The layout conversion unit 214 transmits, to the front-end unit 123b of the target device, the screen layout data generated by the conversion.

In response to receiving the screen layout data, the layout reception unit 132 of the front-end unit 123b displays in step 207, based on the screen layout data, the document list screen 510 in an initial state. The initial state represents a state shown in FIG. 11.

Further, subsequent to step S205, based on the script constituting the content data of the Web app of the cloud pull print, the browser unit 212 transmits, to the server apparatus 50 in step S208, an obtaining request for obtaining the list of the documents related to the user A. The transmitted obtaining request includes the user ID included in the use request for using the browser. In response to the obtaining request, the document management unit 52 of the server apparatus 50 returns (transmits) the document list data in step S209 similar to step S125 shown in FIG. 10. Contents of the document list data may be contents as shown in FIG. 13, for example.

Subsequently, based on the script constituting the Web app of the cloud pull print and the obtained document list data, the browser unit 212 updates the DOM tree relating to the document list screen 510 to perform the drawing process for the updated part in step S210. As a result, the DOM shown in FIG. 12 is updated as shown in FIG. 14. The browser unit 212 notifies the browser control unit 213 of completion of the drawing process.

It should be noted that depending the number of documents included in the document list, there is a likelihood that all documents cannot fit within the document list display area 511 (some documents may protrude from the document list display area 511). In this case, one or more display elements for receiving a scroll operation (operation for scrolling the document list) may be added to the document list screen 510 in a case in which the documents to be displayed cannot be scrolled in the target device by a touch operation (such as swipe/flick), for example, sliding a finger on a touch screen. It should be noted that the scroll operation is an example of a specific operation.

Figure 23:
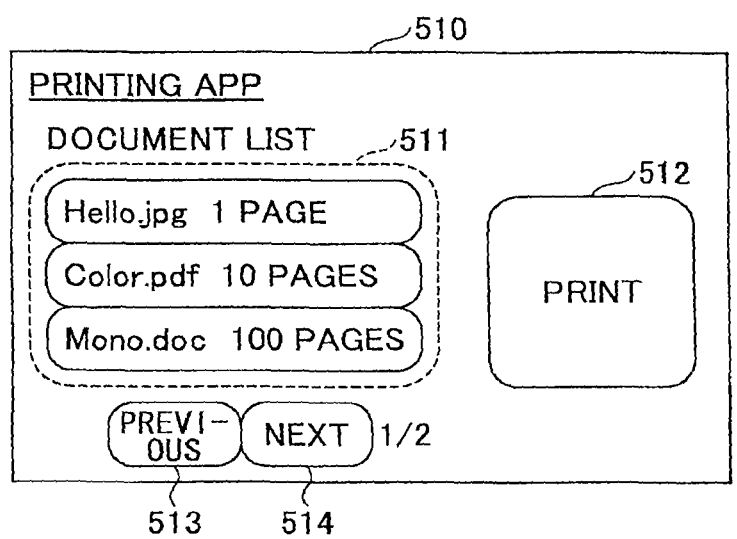
FIG. 23 is a diagram illustrating an example of the document list screen to which display elements for receiving a scroll operation are added.

FIG. 23 is a diagram illustrating an example of the document list screen 510 to which display elements for receiving the scroll operation are added. The document list screen 510 shown in FIG. 23 includes a previous button 513 and a next button 514. These buttons are buttons for moving (changing) back and forth documents to be displayed. In a case in which these buttons are added, the browser unit 212 adds DOM elements corresponding to these buttons to the DOM tree. It should be noted that whether the target device can receive an operation such as a swipe can be determined with reference to the operation specification storage unit 224 (FIG. 21).

Subsequently, when the browser control unit 213 obtains the DOM tree (FIG. 14) from the browser unit 212 to input the obtained DOM tree in the layout conversion unit 214, the layout conversion unit 214 converts the input DOM tree into the screen layout data in step S211. It should be noted that if the front-end unit 123b can receive only the update part of the screen layout data, the update part among the DOM tree may be converted. The layout conversion unit 214 transmits, to the front-end unit 123b of the target device, the screen layout data generated by the conversion.

In response to receiving the screen layout data, the layout reception unit 132 of the front-end unit 123b of the target device updates the document list screen 510 in step S212 based on the received screen layout data. That is a display state of the document list screen 510 is updated as shown in FIG. 15.

Subsequently, when the user selects in step S213, from list items included in the document list display area 511, (one or more) list items corresponding to the documents to be printed, the operation information transmission unit 133 of the front-end unit 123b of the target device transmits, to the back-end unit 21 in step S214, identification information corresponding to the selected list items and operation information including information that represents that the list items are selected. For example, as shown in FIG. 16, in a case in which the list item related to the document whose file name is "Hello.jpg" is selected, the document ID "Doc1855" associated with the selected list item is transmitted to the back-end unit 21. In this way, the screen layout data provided by the front-end unit 123b is required to include, for each of the display elements to be operated, identification information of the corresponding display element. For example, in a case in which it is a list item, the screen layout data is required to include a value of the Value attribute corresponding to the list item.

In response to receiving the operation information, the operation information reception unit 215 of the back-end unit 21 generates event information, which corresponds to the received operation information, in a format that can be interpreted by the browser unit 212. The browser control unit 213 inputs the generated event information in the browser unit 212 in step S215. As a result, when the list item related to the document whose file name is "Hello.jpg" is selected, an event, similar to an event detected by the browser unit 122a of the image forming apparatus 10a, is detected by the browser unit 212. In response to the detection of the event, in the DOM tree, the browser unit 212 sets a value of the Checked attribute of the CheckBox node corresponding to the list item, which is the selection object in the event, as "true" in step S216. It should be noted that the screen layout data corresponding to update of the value of the CheckBox node is transmitted to the front-end unit 123b. Based on the screen layout data, the layout reception unit 132 of the front-end unit 123b changes a display state of the selected list item as shown in FIG. 16.

Subsequently, when the user A pushes the print button 512 in step S217, the operation information transmission unit 133 of the front-end unit 123b of the target device transmits, to the back-end unit 21 in step S218, operation information that represents that the print button 512 is pushed. In response to receiving the operation information, the operation information reception unit 215 of the back-end unit 21 generates event information, which corresponds to the received operation information, in a format that can be interpreted by the browser unit 212. The browser control unit 213 inputs the generated event information in the browser unit 212 in step S219. As a result, when the print button 512 is pushed, an event, similar to an event detected by the browser unit 122a of the image forming apparatus 10a, is detected by the browser unit 212. In response to the event, based on the script constituting the Web app of the cloud pull print, the browser unit 212 transmits, to the server apparatus 50 in step S220, an obtaining request for obtaining a data file relating to the selected document. The obtaining request includes the value (that is, the document ID) of the Value attribute of the CheckBox node whose value of the Checked attribute is "true".

The document management unit 52 of the server apparatus 50 obtains, from the auxiliary storage device 202 for example, the data file relating to the document ID included in the transmitted obtaining request, and returns (transmits) the obtained data file to the browser unit 212 in step S221. It should be noted that the date file returned to the target device is not limited to a file format.

When the browser unit 212 receives the data file, the browser unit 212 requests the device service mediation unit 216 of the back-end unit 21 to print the received data file in step S222 based on the execution instruction of the printing defined in the script constituting the Web app of the cloud pull print. It should be noted that the device service mediation unit 216 for the browser unit 212 is similar to the device service unit 121a for the browser unit 122a. That is, the device service mediation unit 216 emulates the device service unit 121a to provide, to the browser unit 212, an interface similar to the device service unit 121a. Accordingly, the browser unit 212 can perform a printing request by a process similar to the process operated on the image forming apparatus 10a.

Subsequently, the device service mediation unit 216 transmits, to the device service disclosure unit 134 of the front-end unit 123b of the target device in step S223, a printing request for printing the data file. In response to receiving the printing request, the device service disclosure unit 134 of the front-end unit 123b of the target device requests the device service unit 121b to print the data file in step S224. In response to the request, the device service unit 121b executes a print job relating to the data file in step S225. As a result, the document selected by the user A in the document list screen 510 is printed.

As described above, according to the embodiment, the external browser apparatus 20 can analyze the definition contents of the Web app and generate data for displaying the screen of the analyzed Web app in a format interpreted by the image forming apparatus 10b. Thus, the incompatibility with the Web app in the image forming apparatus 10b can be resolved. That is, even when the user operates the image forming apparatus 10b, the Web app can be usable.

It should be noted that although the Web app for the cloud pull print is described above, an applicable range of the embodiment is not limited to a Web app for a specific service. For example, the embodiment may be applied to a Web app corresponding to a service (in the following, referred to as the "cloud scan" as appropriate) for automatically uploading, on the server apparatus 50 or the like, image data (in the following, referred to as the "scanned image" as appropriate) read from one or more documents when an instruction to execute scanning is made to the image forming apparatus 10.

Figure 24:
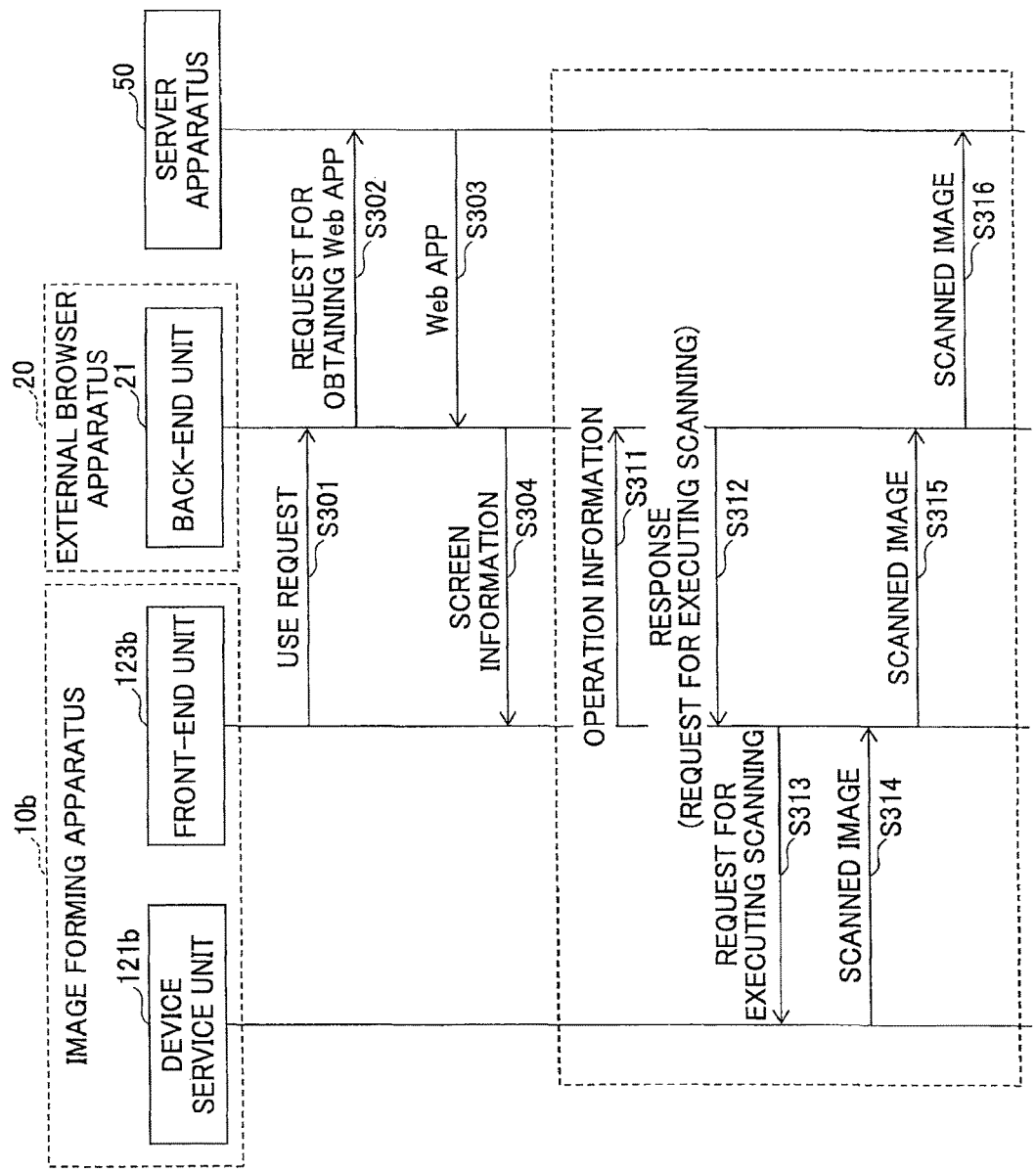
FIG. 24 is a sequence chart illustrating a first example of processing procedures executed for a cloud scan.

FIG. 24 is a sequence chart illustrating a first example of processing procedures executed for the cloud scan.

In step S301, the use request unit 131 of the front-end unit 123b transmits, to the back-end unit 21, a use request for using a browser. In response to the use request, the connection management unit 211 of the back-end unit 21 executes a preparation process. Here, the Web app for the cloud scan is to be obtained. Thus, the browser unit 212 transmits, to an URL corresponding to the Web app in step S302, an obtaining request for obtaining content data of the Web app. When the content data is returned (transmitted) from the server apparatus 50 in step S303, the browser unit 212 executes a drawing process as described in FIG. 5B. As a result, a DOM tree related to the Web app is generated. The generated DOM tree is converted into screen layout data by the layout conversion unit 214, and the screen layout data is transmitted to the front-end unit 123b in step S304. When receiving the screen layout data, the layout reception unit 132 of the front-end unit 123b displays, on the operation panel 15, a screen corresponding to the Web app of the cloud scan based on the received screen layout data. In the displayed screen, for example, a button (in the following, referred to as the "scan start button") for receiving an instruction to execute scanning is arranged.

When one or more documents are set on the image forming apparatus 10b and the scan start button is pushed, the operation information transmission unit 133 of the front-end unit 123b transmits, to the back-end unit 21 in step S311, operation information representing that the scan start button is pushed. Subsequently, an event corresponding to the operation information is input in the browser unit 212 of the back-end unit 21. The browser unit 212 requests the device service mediation unit 216 to execute the scanning based on the instruction to execute the scanning defined in the script constituting the Web app of the cloud scan. In response to the request, the device service mediation unit 216 transmits, to the front-end unit 123b in step S312, an execution request for executing the scanning. It should be noted that in a case in which communication between the front-end unit 123b and the back-end unit 21 is performed using hypertext transfer protocol (HTTP), the operation information in step S311 may be a HTTP request and the execution request for executing the scanning in step S312 may be a HTTP response to the HTTP request. This point is common to the cloud pull print.

In response to the execution request for executing the scanning, the device service disclosure unit 134 of the front-end unit 123b requests the device service unit 121b to execute the scanning in step S313. For example, the request may be performed by a function call. The device service unit 121b controls the image forming apparatus 10b and causes the image forming apparatus 10b to execute the scanning of the document. The device service unit 121b outputs, to the device service disclosure unit 134 in step S314, a scanned image obtained by scanning the document. The device service disclosure unit 134 transmits the scanned image to the device service mediation unit 216 of the back-end unit 21 in step S315. The device service mediation unit 216 transmits the scanned image to a predetermined folder of the server apparatus 50 in step S316.

Figure 25:
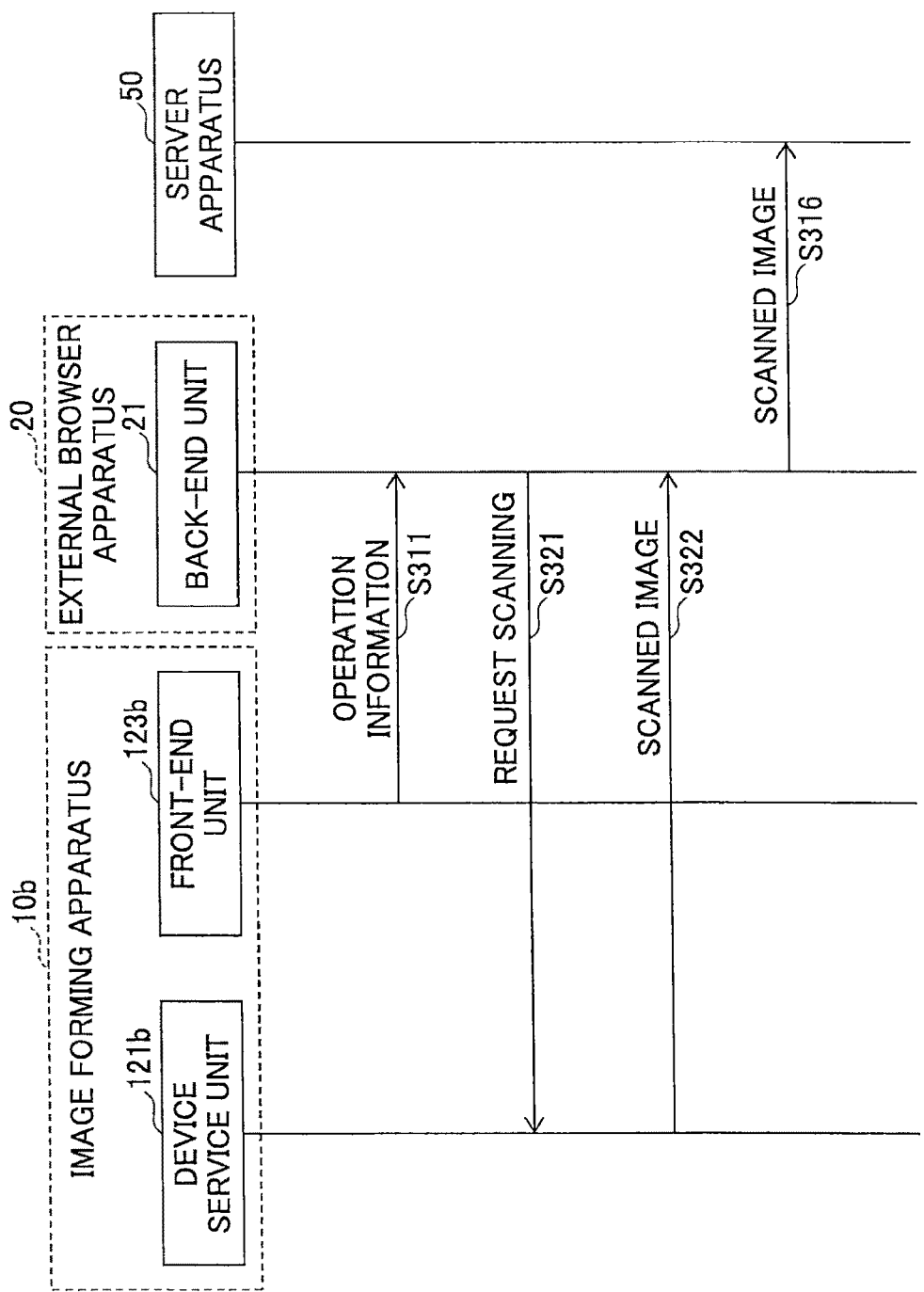
FIG. 25 is a sequence chart illustrating a second example of processing procedures executed for the cloud scan.
Figure 26:
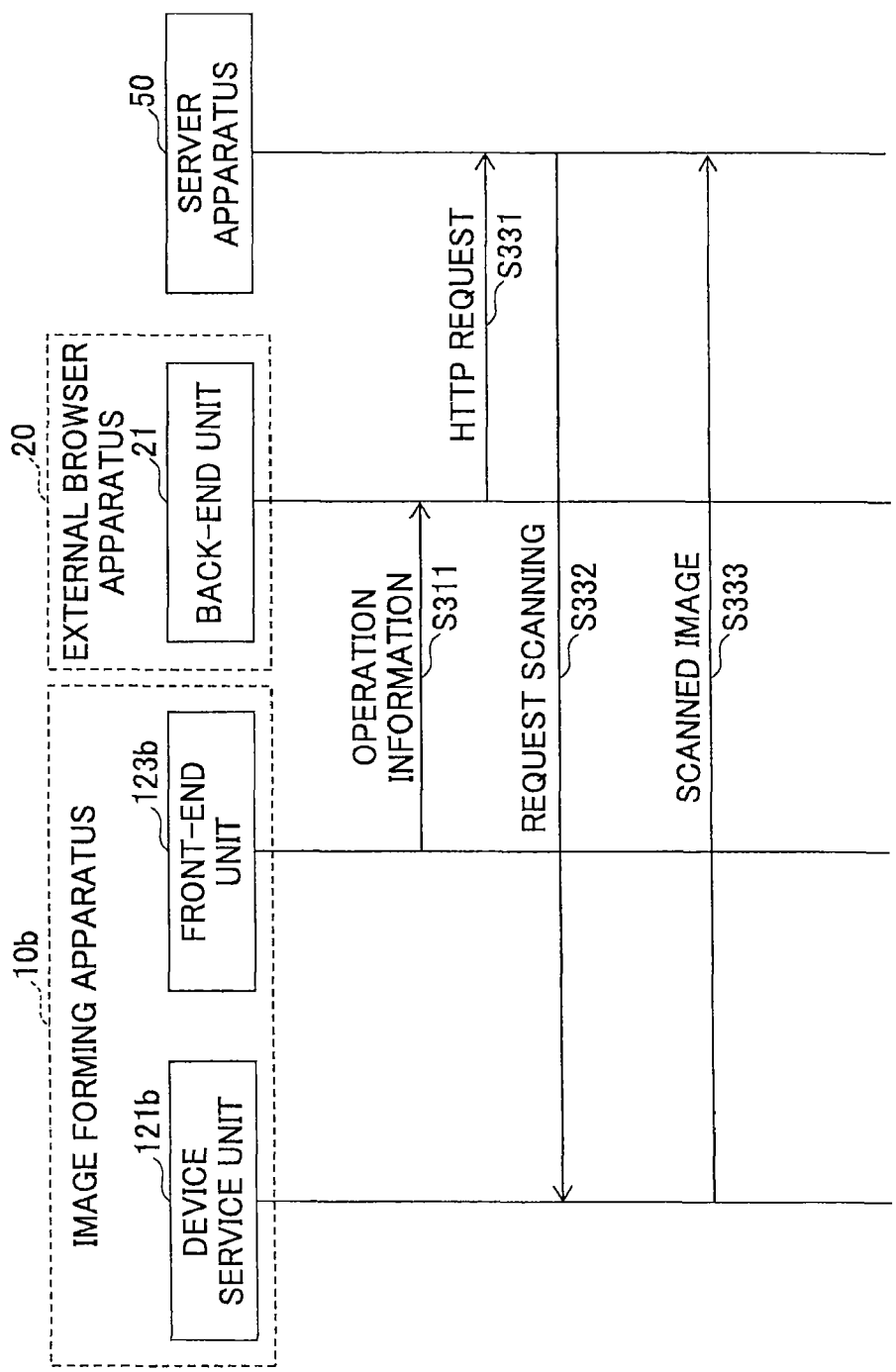
FIG. 26 is a sequence chart illustrating a third example of processing procedures executed for the cloud scan.

It should be noted that in FIG. 24, the processing procedures surrounded by a dotted line may be replaced as shown in FIG. 25 or FIG. 26.

FIG. 25 is a sequence chart illustrating a second example of processing procedures executed for the cloud scan. In FIG. 25, same step numbers are given to steps same as the steps in FIG. 24 and their description are omitted.

In FIG. 25, processes executed by the back-end unit based on the operation information in step S311 are different from the processes in FIG. 24. Specifically, in response to an input of an event corresponding to the operation information, based on the instruction to execute the scanning defined in the script constituting the Web app of the cloud scan, the browser unit 212 requests the device service mediation unit 216 to execute the scanning. In response to the request, the device service mediation unit 216 transmits, to the device service unit 121 of the image forming apparatus 10b in step S321, an execution request for executing the scanning.

That is, the second example shown in FIG. 25 is effective in a case in which the API of the device service unit 121 is callable via the network as a "Web API", for example. The "Web API" is an API in which each method is distinguished by a URL.

When receiving the execution request for executing the scanning, the device service unit 121b controls the image forming apparatus 10b and causes the image forming apparatus 10b to execute the scanning of the document. The device service unit 121b transmits (returns), to the device service mediation unit 216 of the back-end unit 21 in step S322, the scanned image obtained by scanning the document. The device service mediation unit 216 transmits the scanned image to a predetermined folder of the server apparatus 50 in step S316.

FIG. 26 is a sequence chart illustrating a third example of processing procedures executed for the cloud scan. In FIG. 26, same step numbers are given to steps same as the steps in FIG. 24 and their description are omitted.

In FIG. 26, processes executed by the back-end unit 21 based on the operation information in step S311 are different from the processes in FIG. 24. Specifically, in response to an input of an event corresponding to the operation information, based on a definition of HTML constituting the Web app, the browser unit 212 transmits, to the server apparatus 50 in step S331, a HTTP request that represents an execution request for executing the scanning. That is, in the third example, the definition of the HTML constituting the Web app is different from the first example and the second example. In the HTML of the third example, as a process corresponding to a push of the scan start button, transmission of the HTTP request that represents the execution request for executing the scanning to the server apparatus 50 is defined. Such a definition may be performed without using the script. Thus, in the third example, content data constituting the Web app does not have to include the script. However, the HTTP request in step S331 may be executed based on the definition of the script. It should be noted that the HTTP request in step S331 is equivalent to (corresponds to) a request for transmitting, to the image forming apparatus 10b, an instruction to execute the process. It should be noted that the HTTP request in step S331 is equivalent to a transmission request for requesting transmission of the instruction to execute the process to the image forming apparatus 10b. Thus, in response to the transmission request, the server apparatus 50 (another information apparatus) transmits, to the image forming apparatus 10b in step S332, the instruction to execute the process (scanning).

In response to the HTTP request, the server apparatus 50 transmits, to the device service unit 121 of the image forming apparatus 10b in step S332, an execution request for executing the scanning. That is, similar to the second example (FIG. 25), the third example shown in FIG. 26 is effective in a case in which the API of the device service unit 121 is callable via the network as a Web API, for example. A method of the device service unit 121 called in step S332 may be the same method called in step S321.

When receiving the execution request for executing the scanning, the device service unit 121b controls the image forming apparatus 10b and causes the image forming apparatus 10b to execute the scanning of the document. The device service unit 121b transmits (returns), to the server apparatus 50 in step S333, the scanned image obtained by scanning the document. The server apparatus 50 stores the scanned image in a predetermined folder.

In this way, the back-end unit 21 and the front-end unit 123b can also function effectively for the cloud scan. It should be noted that the described processing procedures for the cloud pull print shown in FIG. 17 correspond to the processing procedures in FIG. 24 among the processing procedures in FIG. 24 to FIG. 26. That is, in step S223 shown in FIG. 17, the device service mediation unit 216 transmits the printing request to the device service disclosure unit 134 of the front-end unit 123b. If the operation information transmitted in step S218 is the HTTP request, the printing request may be a HTTP response to the HTTP request.

However, processing procedures similar to the processing procedures shown in FIG. 25 or FIG. 26 may be implemented for the cloud pull print. In a case in which processing procedures similar to the processing procedures shown in FIG. 25 are implemented for the cloud pull print, the device service mediation unit 216 may transmit, to the device service unit 121b, the printing request including the data file of the document. In a case in which processing procedures similar to the processing procedures shown in FIG. 26 are implemented for the cloud pull print, the browser unit 212 may transmit, to the server apparatus 50, the HTTP request, which represents the printing request, including the data file of the document. In response to the HTTP Request, the server apparatus 50 may transmit, to the device service unit 121b, the printing request including the data file. However, in this case, it is required to change definition contents of the HTML constituting the Web app related to the cloud pull print.

It should be noted that the server apparatus 50 and the browser apparatus 20 may be structured with the same computer. In this case, depending on a request source that requests to obtain content data of a Web app, the computer may determine whether to transmit the content data as it is or to convert the content data into the screen layout data by using functions of the external browser apparatus 20. For example, information that represents whether the content data of the Web app can be returned (transmitted) as it is or it is required to convert the content data into the screen layout data may be stored in a storage device or the like that the computer can refer to. This information may be stored for each machine or each type (model) of the image forming apparatus 10. Further, information that represents whether the content data can be interpreted may be included in the obtaining request for obtaining the content data from the image forming apparatus 10.

It should be noted that the above described embodiment may be applied to one or more devices other than the image forming apparatus 10. For example, the embodiment may be applied to one or more Web apps for projectors, electronic whiteboards, TV conference systems, digital cameras or the like.

Further, the embodiment may be applied with respect to data other than the Web apps. For example, in a case in which data (display data, for example) that a first device can interpret is different from data that a second device can interpret, either one (second device, for example) of the devices may be connected to an apparatus equivalent to the external browser apparatus 20. The connected apparatus may convert the data that can be interpreted by the first device into the data that can be interpreted by the second device, and provide the converted data (conversion result) to the second device.

It should be noted that in the embodiment, the external browser apparatus 20 is an example of an information processing apparatus. The image forming apparatus 10*b* is an example of a device. The layout conversion unit 214 is an example of a conversion unit and a first transmission unit. The operation information reception unit 215 is an example of a first reception unit. The device service mediation unit 216 is an example of a second transmission unit (in claim 1). The browser unit 212 is an example of a second transmission unit (in claim 2) and a drawing unit. The connection management unit 211 is an example of a second reception unit. A format of the screen layout data is an example of a first format. A format of the content data of the Web app is an example of a second format. The operation panel 15 is an example of a display unit of the device.

It should be noted that a person skilled in the field of information processing technology may employ the present invention using application specific integrated circuits (ASIC) or an apparatus in which circuit modules are connected.

Further, each of the functions (units) may be implemented by one or more circuits.

It should be noted that, in this specification, the circuit may include a processor programmed by software to execute the corresponding functions and hardware which is designed to execute the corresponding functions such as the ASIC and the circuit module.

Further, the present invention is not limited to these embodiments, but various variations and modifications may be made without departing from the scope of the present invention.

The present application is based on and claims the benefit of priority of Japanese Priority Application No. 2015-102388 filed on May 20, 2015, with the Japanese Patent Office, the entire contents of which are hereby incorporated by reference.

What is claimed is:

1. An information processing apparatus, comprising:
a processor configured to execute a process, the process including
converting second format display data into first format display data that differs from the second format display data, the first format display data displayable by a device connected to the information processing apparatus via a network;
transmitting the converted first format display data to the device to display the first format display data on the device;
receiving, from the device, first operation information that represents a first operation input to a screen displayed, based on the first format display data, on the device;
generating, from the first operation information, second operation information that represents a second operation in the second format display data; and
transmitting, to the device, an instruction to execute a second process based on the second operation information.

2. The information processing apparatus according to claim 1, wherein the process further includes transmitting, to another information processing apparatus connected to the information processing apparatus via the network, a transmission request for requesting transmission of the instruction to execute the second process to the device, the second process relating to the first operation represented by the first operation information.

3. The information processing apparatus according to claim 1, wherein the process further comprises
drawing the screen, and
converting a result, in which the screen is drawn such that the screen fits within a display area in the display of the device, to generate the first format display data.

4. The information processing apparatus according to claim 3, wherein
a plurality of devices including the device are connected to the information processing apparatus via the network, and
the process further comprises
receiving identification information of a first device, of the plurality of devices, that requests the first format display data, and
using display information, associated with the identification information of the first device, that represents a display area in a first display of the first device to draw the screen based on the second format display data such that the screen fits within the display area in the first display of the first device.

5. The information processing apparatus according to claim 4, wherein the process further comprises adding a display element for receiving a specific operation to the screen with reference to the display information, associated with the identification information of the first device, that represents the display area in the first display of the first device.

6. The information processing apparatus according to claim 1, wherein
the second format display data is HTML data, and
the processing further comprises transmitting, to the device, the instruction to execute the second process.

7. The information processing apparatus according to claim 1, wherein the instruction to execute the second process is to execute scanning or an instruction to execute printing.

8. An information processing system, comprising:
a device; and
an information processing apparatus connected to the device via a network, the information processing apparatus including a processor configured to execute a process, the process including:

converting second format display data into first format display data that differs from the second format display data, the first format display data displayable by the device connected to the information processing apparatus; and transmitting the converted first format display data to the device to display the first format display data on the device;

receiving, from the device, first operation information that represents a first operation input to a screen displayed, based on the first format display data, on the device;

generating, from the first operation information, second operation information that represents a second operation in the second format display data, and transmitting, to the device, an instruction to execute a second process based on the second operation information, wherein the device executes the second process in accordance with the instruction.

9. The information processing system according to claim 8, wherein the process further includes transmitting, to another information processing apparatus connected to the information processing apparatus via the network, a transmission request for requesting transmission of the instruction to execute the second process to the device, the second process relating to the first operation represented by the first operation information.

10. An information processing method for an information processing system including a device and an information processing apparatus connected to the device via a network, the information processing method comprising:

converting, by a processor of the information processing apparatus, second format display data into first format display data that differs from the second format display data, the first format display data displayable by the device;

transmitting, by the processor, the converted first format display data to the device to display the first format display data on the device;

receiving, by the processor from the device, first operation information that represents a first operation input to a screen displayed, based on the first format display data, on the device;

generating, by the processor, from the first operation information, second operation information that represents a second operation in the second format display data; and transmitting, by the processor to the device, an instruction to execute a process based on the second operation information, wherein the device executes the process in accordance with the instruction.

11. The information processing method according to claim 10, further comprising:

transmitting, to another information processing apparatus connected to the information processing apparatus via the network, a transmission request of the instruction to execute the process to the device, the process relating to the first operation represented by the first operation information.

12. The information processing method according to claim 10, further comprising:

drawing the screen based on the second format display data, wherein in the converting a result, in which the screen is drawn such that the screen fits within a display area in the display of the device, to generate the first format display data.

13. The information processing method according to claim 12, wherein a plurality of devices including the device are connected to the information processing apparatus via the network, the information processing method further comprises receiving identification information of a first device, of the plurality of devices, that requests the first format display data, and in the drawing, display information, associated with the identification information of the first device, that represents a display area in a first display of the first device is used to draw the screen based on the second format display data such that the screen fits within the display area in the first display of the first device.

14. The information processing method according to claim 13, wherein in the drawing, a display element for receiving a specific operation to the screen is added with reference to the display information, associated with the identification information of the first device, that represents the display area in the first display of the first device.

15. The information processing method according to claim 10, wherein the second format display data is HTML data, and the instruction to execute the process defined by a script in the second format display data is transmitted to the device.

16. The information processing method according to claim 10, wherein the instruction to execute the process is to execute scanning or an instruction to execute printing.

17. The information processing system according to claim 8, wherein the process further comprises drawing the screen, and converting a result, in which the screen is drawn such that the screen fits within a display area in the display of the device, to generate the first format display data.

18. The information processing system according to claim 17, further comprising a plurality of devices, wherein the plurality of devices includes the device, the plurality of devices are connected to the information processing apparatus via the network, and the process further comprises receiving identification information of a first device, of the plurality of devices, that requests the first format display data, and using display information, associated with the identification information of the first device, that represents a display area in a first display of the first device to draw the screen based on the second format display data such that the screen fits within the display area in the first display of the first device.

19. The information processing system according to claim 8, wherein the second format display data is HTML data, and the process further comprises transmitting, to the device, the instruction to execute the process defined by a script in the second format display data.

20. The information processing system according to claim 8, wherein the instruction to execute the second process is to execute scanning or an instruction to execute printing.

* * * * *